United States Patent
Engel et al.

(10) Patent No.: US 9,268,729 B2
(45) Date of Patent: *Feb. 23, 2016

(54) SYSTEMS AND METHODS FOR EFFICIENT HANDLING OF DATA TRAFFIC AND PROCESSING WITHIN A PROCESSING DEVICE

(75) Inventors: Yehiel Engel, Moshav Zerofa (IL); Avraham Ganor, Shoham (IL); Tal Horowitz, Haifa (IL); Michael Chaim Schnarch, Neve-Savion (IL); Yaron Shachar, Raanana (IL); Uri Chanan Weiser, Atlit (IL)

(73) Assignee: Commex Technologies, Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,932

(22) Filed: May 18, 2012

(65) Prior Publication Data

US 2013/0016729 A1 Jan. 17, 2013

Related U.S. Application Data

(63) Continuation of application No. 12/875,343, filed on Sep. 3, 2010, now Pat. No. 8,209,457, which is a continuation of application No. 11/776,285, filed on Jul. 11, 2007, now Pat. No. 7,793,032.

(51) Int. Cl.
*G06F 13/00* (2006.01)
*G06F 13/42* (2006.01)
*G06F 13/40* (2006.01)

(52) U.S. Cl.
CPC ......... *G06F 13/4027* (2013.01); *Y02B 60/1228* (2013.01); *Y02B 60/1235* (2013.01)

(58) Field of Classification Search
USPC .......... 710/104, 105, 316, 317; 370/351, 373, 370/374, 377, 378, 381, 384, 392, 394, 422
See application file for complete search history.

(56) References Cited

U.S. PATENT DOCUMENTS

| | | |
|---|---|---|
| 5,561,669 A | 10/1996 | Lenney et al. |
| 5,761,516 A * | 6/1998 | Rostoker et al. ............. 710/260 |
| 5,982,296 A | 11/1999 | Wakasa et al. |
| 6,356,942 B1 * | 3/2002 | Bengtsson ............ G06F 9/4403 709/219 |
| 6,359,886 B1 * | 3/2002 | Ujihara et al. ................. 370/392 |
| 6,370,583 B1 * | 4/2002 | Fishler et al. ................. 709/238 |
| 6,768,742 B1 | 7/2004 | Godfrey |
| 6,775,719 B1 | 8/2004 | Leitner et al. |
| 6,788,704 B1 * | 9/2004 | Lindsay ........................ 370/465 |
| 6,993,621 B1 * | 1/2006 | Black et al. .................... 710/317 |
| 7,031,258 B1 | 4/2006 | Frisch et al. |
| 7,032,031 B2 | 4/2006 | Jungck et al. |
| 7,051,150 B2 | 5/2006 | Naumann et al. |
| 7,065,050 B1 | 6/2006 | Herbst |
| 7,114,008 B2 | 9/2006 | Jungck et al. |
| 7,210,000 B2 | 4/2007 | Creta et al. |

(Continued)

OTHER PUBLICATIONS

Office Action issued in U.S. Appl. No. 12/725,210 on Jan. 25, 2012, 11 pages.

*Primary Examiner* — Faisal M Zaman
(74) *Attorney, Agent, or Firm* — Rothwell, Figg, Ernst & Manbeck, P.C.

(57) ABSTRACT

The present invention provides an improved platform hub that aims to, in some embodiments, optimize system resources to improve system performance and/or reduce consumption of power.

19 Claims, 31 Drawing Sheets

(56) References Cited

U.S. PATENT DOCUMENTS

| | | |
|---|---|---|
| 7,251,215 B1 | 7/2007 | Turner et al. |
| 7,254,114 B1 | 8/2007 | Turner et al. |
| 7,260,616 B1 | 8/2007 | Cook |
| 7,277,449 B2 | 10/2007 | Garinger et al. |
| 7,284,082 B2 | 10/2007 | Greenberger |
| 7,293,113 B1 | 11/2007 | Krishna et al. |
| 7,640,347 B1 * | 12/2009 | Sloat .................. H04L 67/2842 709/203 |
| 8,688,868 B2 * | 4/2014 | Vasudevan ......... G06F 12/0806 370/351 |
| 2002/0062333 A1 * | 5/2002 | Anand .................. G06F 9/5027 718/105 |
| 2002/0065938 A1 | 5/2002 | Jungck et al. |
| 2002/0071450 A1 | 6/2002 | Gasbarro et al. |
| 2002/0194291 A1 | 12/2002 | Najam et al. |
| 2002/0199014 A1 | 12/2002 | Yang et al. |
| 2003/0055818 A1 | 3/2003 | Faybishenko et al. |
| 2003/0223366 A1 * | 12/2003 | Jeffries ................... H04L 47/10 370/231 |
| 2004/0153460 A1 * | 8/2004 | Corl, Jr. ............. G06F 17/30289 |
| 2004/0196790 A1 * | 10/2004 | Balakrishnan .......... H04L 47/10 370/232 |
| 2005/0091396 A1 | 4/2005 | Nilakantan et al. |
| 2005/0213611 A1 | 9/2005 | James |
| 2006/0002385 A1 | 1/2006 | Johnsen et al. |
| 2006/0007860 A1 * | 1/2006 | Komisky ....................... 370/230 |
| 2006/0029038 A1 | 2/2006 | Jungck |
| 2006/0029104 A1 | 2/2006 | Jungck |
| 2006/0039372 A1 * | 2/2006 | Sarkinen ................ H04Q 11/04 370/389 |
| 2006/0203816 A1 * | 9/2006 | O'Malley et al. ............. 370/389 |
| 2006/0209804 A1 | 9/2006 | Nakajima et al. |
| 2007/0127465 A1 * | 6/2007 | Faye ..................... H04W 36/02 370/389 |
| 2007/0136533 A1 * | 6/2007 | Church .............. G06Q 30/0277 711/137 |
| 2007/0140128 A1 | 6/2007 | Klinker et al. |
| 2007/0291782 A1 * | 12/2007 | Basso et al. ..................... 370/428 |
| 2008/0025289 A1 | 1/2008 | Kapur et al. |
| 2008/0043632 A1 * | 2/2008 | Tripathi ................... H04L 43/50 370/251 |
| 2008/0151935 A1 | 6/2008 | Sarkinen et al. |
| 2008/0240140 A1 * | 10/2008 | Dabagh .................... H04L 49/90 370/412 |
| 2010/0329256 A1 * | 12/2010 | Akella ................ H04L 12/4625 370/392 |
| 2011/0228674 A1 * | 9/2011 | Pais ........................ H04L 49/90 370/235 |
| 2014/0029617 A1 * | 1/2014 | Wang ..................... H04L 45/38 370/392 |

\* cited by examiner

SYSTEMS AND METHODS FOR EFFICIENT HANDLING OF DATA TRAFFIC AND PROCESSING WITHIN A PROCESSING DEVICE

CROSS-REFERENCE TO RELATED APPLICATION

This application is a continuation of pending U.S. application Ser. No. 12/875,343, filed Sept. 3, 2010, which is a continuation of U.S. application Ser. No. 11/776,285, filed Jul. 1, 2007 (U.S. Pat. No., 7,793,032), the entire contents of which are incorporated herein by reference.

BACKGROUND

1. Field of the Invention

The present invention relates generally to processing devices, and, more specifically to systems and methods for improving the handling of the movement of data and processing of data within a processing device.

2. Discussion of the Background

FIG. 1 illustrates a conventional processing device 100. Processing device 100 includes a housing 102 that houses one or more agents 110 and a platform hub 120. For example, housing 102 may house the following agents: zero or more acceleration agents 110a(1)-110a(N), zero or more processing agents 110b(1)-110b(N), zero or more communication agents 110c(1)-110c(N), zero or more storage agents 110d, zero or more legacy agents 110e, zero or more external memory agents 110f, etc. A communication agent 110c may include a physical connection to a communication channel (e.g., a fiber cable or Ethernet cable). The platform hub 120 is sometimes referred to as a "south bridge (SB)" or "north bridge (NB)." A processing agent 110b may be an x86 microprocessor from Intel, or may be processing device sold by AMD or other source of processing devices, and the platform hub 120 may be contained in a chip that sits on the same circuit board as a processing agent 110b.

FIG. 2A illustrates one example processing agent 110b. As shown in FIG. 2, a processing agent 110b may include (a) a host 202 that includes one or more central processing units (CPU) and (2) one or more memory banks coupled to host 202. In the example shown, there are two memory banks, one that is positioned to right of the host 202 and one that is positioned to the left of the host 202. FIG. 2B attempts to illustrate another example processing agent 110b. As illustrated in FIG. 2B, a processing agent 110b can also be a multi-processor cluster (e.g. AMD Opteron™ x86 System). In such a case, the platform hub can be connected to one or a subset of processors in the cluster through a SB/NB Link, but can, in most cases, interact with all of the processors or memories in the cluster since the cluster is interconnected.

Platform Hub 120 is configured to enable the agents 110 to communicate with a processing agent 110b, but is not configured to enable the "non-processing agents" (e.g., agents 110a,c,d,e,f) to communicate directly with each other, but this is not the only disadvantage of platform hub 120.

Thus, in the conventional processing device 100, all data must flow through a processing agent 110b. That is, for example, if data output from a communication agent 110c is ultimately destined for a storage agent 110d, the data output from communication agent 110c is received by platform hub 120, which then provides the data to a processing agent 110b such that the data is stored in a memory unit of the processing agent. After the data is stored in the memory unit, the data is then received from the memory unit and provided to platform hub 120, which then provides the data to storage agent 110d. Each data movement transaction consumes system resources due to the data handling and consumes system power due to the data passing process.

Some embodiments of the present invention aim to improve the data handling and/or passing process so as to reduce the amount of system resources and/or power that is consumed.

SUMMARY

In one aspect, the invention provides a processing device. In one embodiment, the processing device includes: a housing; a platform hub housed in the housing; and an agent housed in the housing and connected to the platform hub, wherein the platform hub comprises: an interconnect; and a classification adapter unit, wherein the classification adapter unit is connected between the agent and the interconnect, and the classification adapter unit is configured to interface with the agent such that the classification adapter unit may obtain data from the agent and may provide data to the agent. The data may be a protocol packet (e.g., a TCP/IP packet).

In another aspect, the invention provides a chip for use in a processing device. In one embodiment, the chip includes: an interconnect; a first classification adapter unit circuit directly connected to the interconnect; and a second classification adapter unit circuit directly connected to the interconnect, wherein the interconnect is configured to (a) enable the first classification adapter unit circuit to send data to and receive data from the second classification adapter unit circuit and (b) enable the second classification adapter unit circuit to send data to and receive data from the first classification adapter unit circuit, and the first classification adapter unit circuit is operable to: (1) receive a block of data from an agent, (2) add a directive to at least a portion of the data block, thereby creating a data container, and (3) transmit the data container to the second classification adapter unit circuit by providing the data container to the interconnect.

In another aspect, the invention provides a method. In one embodiment, the method includes: receiving, at a first classification adapter unit, a data block from an agent; creating a directive in response to receiving the data block; adding the directive to the data block, thereby creating a data container comprising the directive and the block of data; providing, from the first classification adapter unit and to an interconnect, the data container created by the first classification adapter unit; receiving the data container at the interconnect, wherein the interconnect provides the data container to a second classification adapter unit; and receiving the data container at the second classification adapter unit, wherein the second classification adapter unit performs an action based, at least in part, on information included in the data container, and the first classification adapter unit, the second classification adapter unit, and the interconnect are built upon a chip and the chip is directly connected to a circuit board.

In some embodiments, the data block is a protocol packet and the step of creating the directive comprises: examining the protocol packet and creating the directive based, at least in part, on information contained in the protocol packet. The step of examining the protocol packet may include (a) examining a header portion of the protocol packet and/or (b) performing a deep packet inspection (i.e., analyzing the payload of the packet in addition to or instead of the header of the packet) (e.g., searching for a pattern or for certain data inside the packet payload).

The above and other embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF PREFERRED EMBODIMENTS

As used herein, the words "a" and "an" mean "one or more."

In one embodiment, the present invention provides an improved platform hub 320, which may be contained in a chip, and which chip may be attached to the same circuit board as a processing agent 110b.

Platform hub 320, in contrast to conventional platform hub 102, may, in some embodiments, be configured to, among other things, enable the non-processing agents to communicate with each other without having to involve a processing agent. Other features that may be implemented by platform hub 320 are described below. Platform hub 320 may replace an existing platform hub 120 or may be used in conjunction with an existing platform hub 120.

Figure 1:
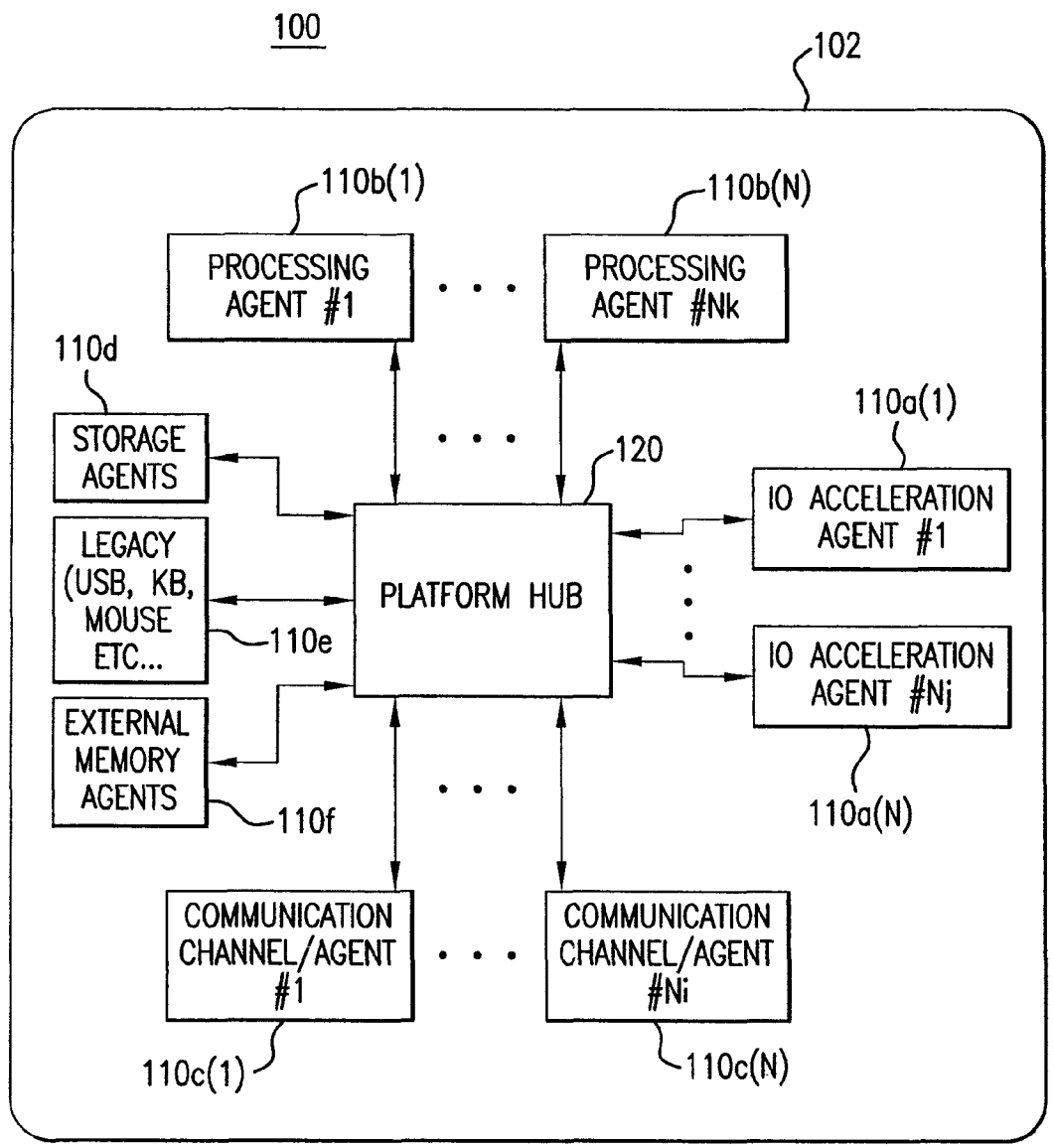
FIG. 1. illustrates a conventional processing device.
Figure 2A:
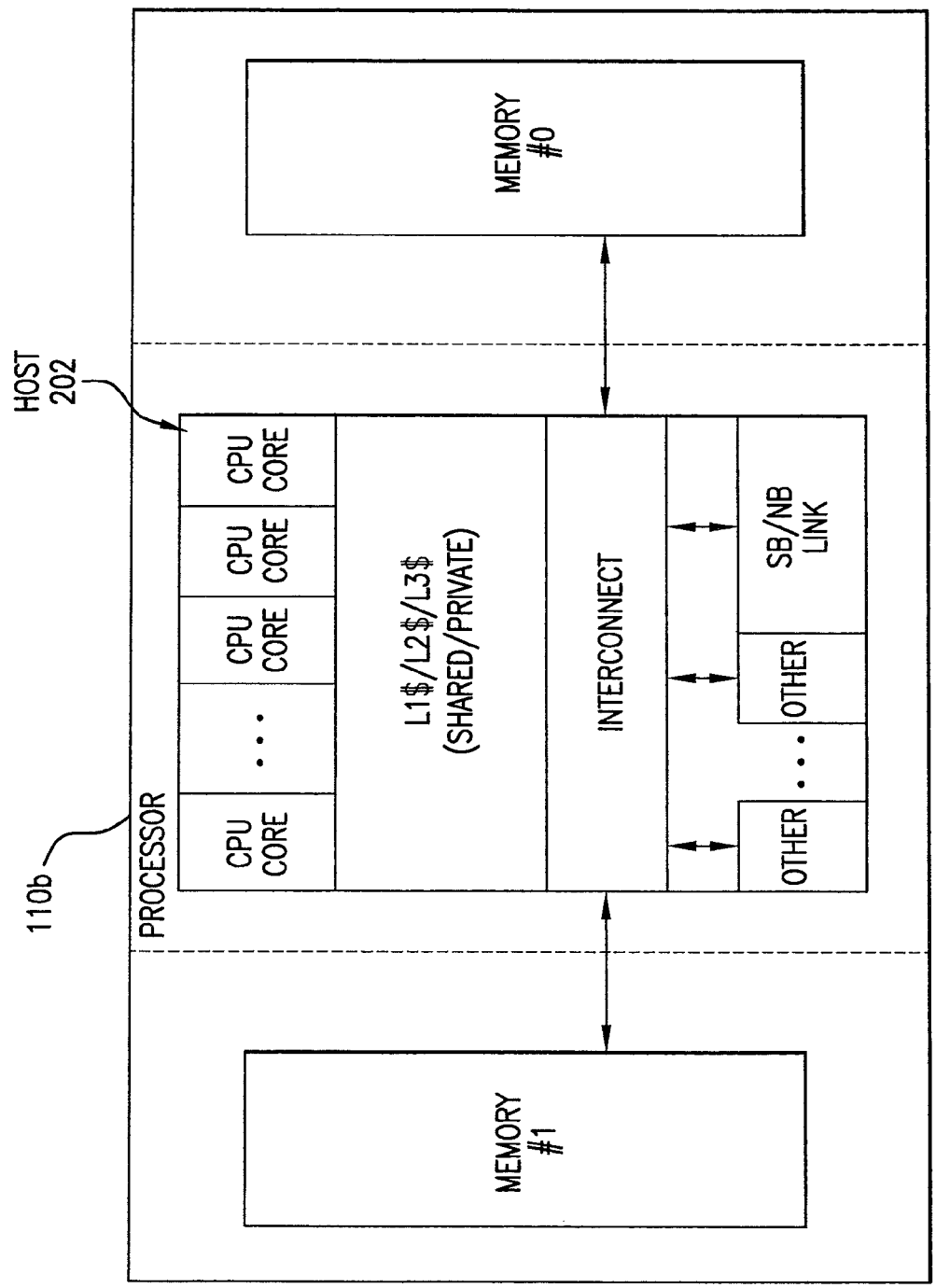
FIG. 2A illustrates a conventional processing agent.
Figure 2B:
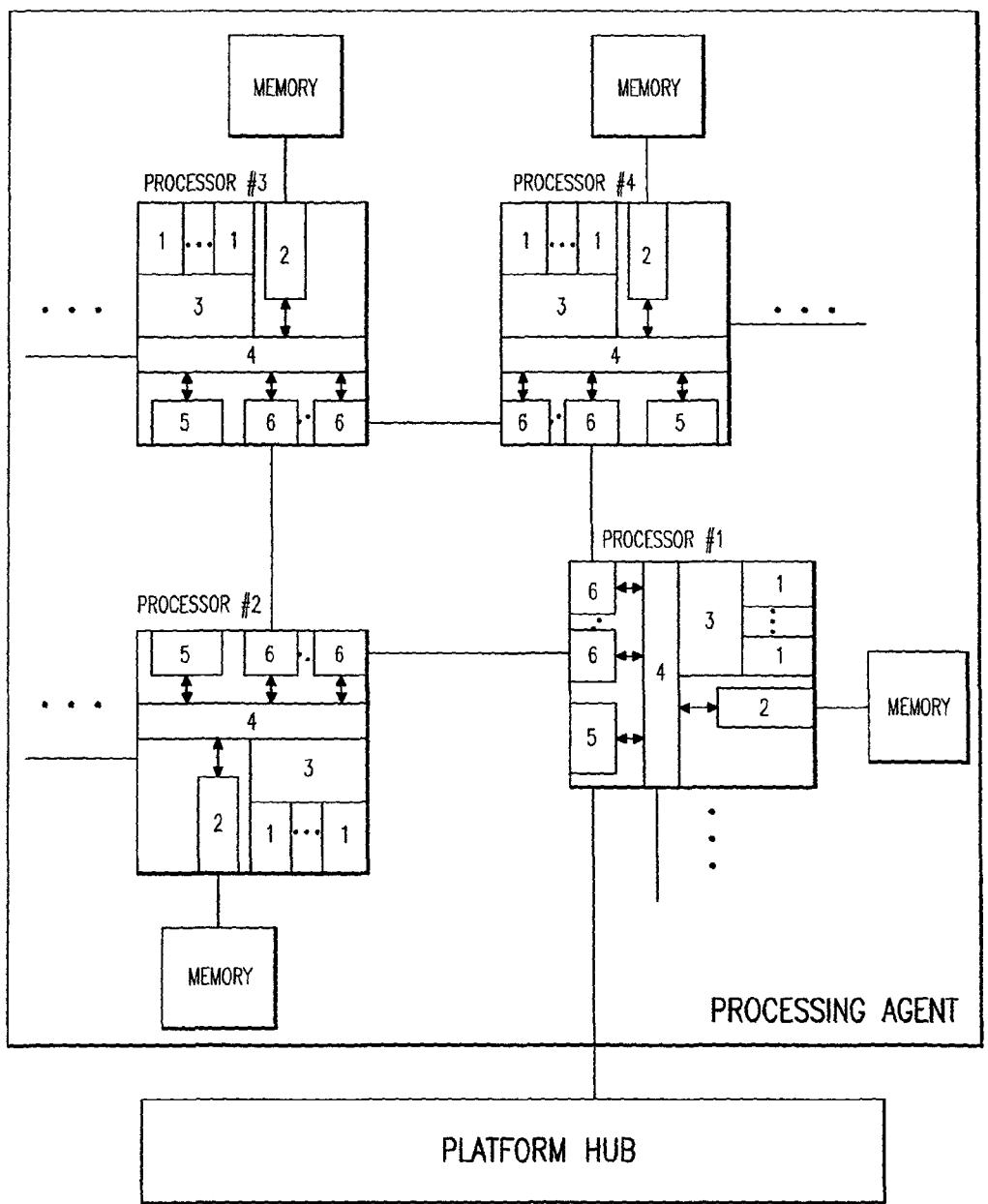
FIG. 2B illustrates another conventional processing agent.
Figure 3:
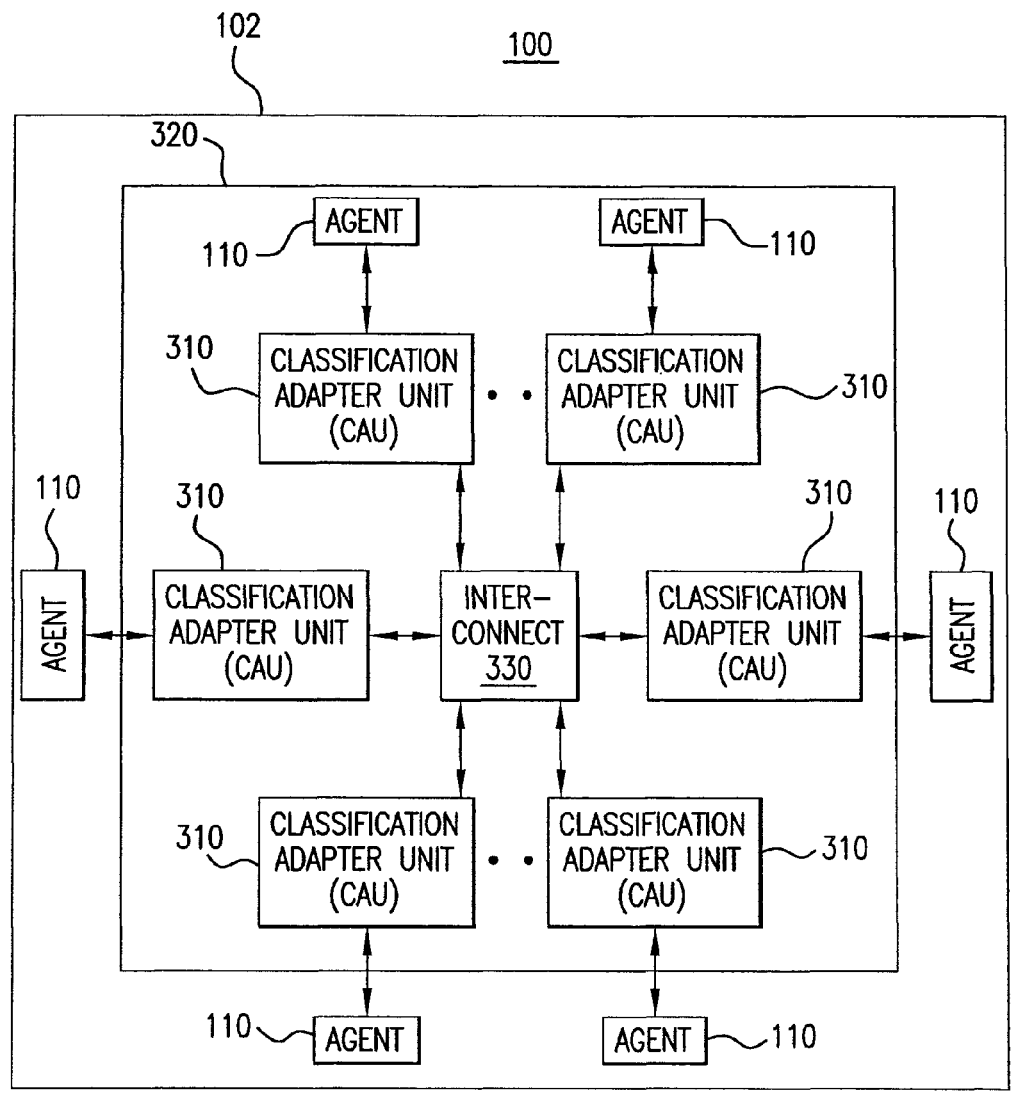
FIG. 3 illustrates a platform hub according to some embodiments of the invention.

As illustrated in FIG. 3, platform hub 320 may include one or more classification adapter units 310 (or "adapters" for short) coupled to an interconnect 330 for receiving data from and transmitting data to a classification adapter unit 310. Interconnect 330 may include a router, a switching circuit (e.g., a crossbar switch or other switching circuit), etc.

In the illustrated embodiment, each classification adapter unit 310 is connected between an agent 110 and interconnect 330. Each adapter 310 may be configured to be able to obtain data directly from the agent 110 to which it is coupled. This data is referred to as a "data payload." This data payload may be a protocol packet (e.g., a TCP packet), a block of information that was created by the agent in order to encapsulate a transaction of some sort, or some other block of data. As illustrated, some agents may be included within hub 320, while others exist outside of hub 320. Additionally, an agent may be included in an adapter unit 310. For example, an agent, such as a central processing unit, my be included in an adapter unit 310.

In some embodiments, an adapter 310 may be configured to (a) obtain from an agent 110 a data payload (e.g., a block of data) (b) examine at least some of the data contained in the data payload and (c) take an action based on the examined data. The action taken may include one or more of the following: (1) communicating information to another adapter 310, (2) communicating information to a processing agent 110b, (3) modifying the data payload, (4) discarding the data payload, etc.

For example, in some embodiments, a communication adapter (i.e., an adapter 310 connected to a communication agent 110c) may be configured to (a) receive from a communication agent a data payload (e.g., a protocol packet such as a TCP/IP packet), (b) examine a header contained in the data payload (e.g., a TCP/IP header), and (c) take some action (e.g., drop the TCP/IP packet) based on information contained in the header of the packet and/or information configured in the adapter 310 (e.g., a list of known viruses, a list of the last 50 flows that exited in the system).

In some embodiments, one adapter 310 may have a different structure and may perform different functions from another adapter 310. For example, a classification adapter 31 that is coupled to an acceleration agent 110a may have different functionality and/or a different structure than a classification adapter 310 that is connected to a processing agent 110b. As another example, a classification adapter 310 that is coupled to a communication agent 110c(1) may have different functionality and/or a different structure than a classification adapter 310 that is coupled to a communication agent 110c(2).

More specifically, in some embodiments, an adapter 310 may be specially designed to match the nature of the agent to which it is connected. This makes the physical design of each of the adapters 310 optimal for the work that needs to be done on data payloads coming from that agent. For example, an adapter serving communication agent 110c(1) may be specially designed to match the nature of the port to which it is connected through agent 110c(1). Accordingly, the design of such an adapter may be optimized for the types of protocol packets that are received by the port to which it is coupled. The distribution to small, different, dedicated adapter enables a hardware implementation that can satisfy the full bandwidth of the port.

In some embodiments, each adapter 310 may implement a directive driven architecture. For example, each adapter 310 may be configured such that it is able to add a "directive" to a data payload received from an agent 110, thereby creating a data container. Thus, this new data structure (the data container) contains information (i.e., the directive) "glued" to the data payload, preferably, at an accessible place (e.g., at the head or tail of the data payload). The encapsulation of a directive in-band with a data payload may allow for efficient use of resources via, for example, effective routing, delivering statistic platform information, and actions to be taken on the data payload.

The directive may include any combination of the following: routing information, quality of service information, vlan-tag insertion commands, information characterizing the data payload (e.g., "this data payload is a media container"), path related information (e.g., information regarding the path the data payload traversed), platform information (e.g., congestion, device status), etc.

Thus, the data payload-directive coupling gives the ability to pass control information in-band with the data payload, instead of passing it out-of-band in a different control path. The in-band control passing method enables the platform hub 320 to be scalable and be able to link other platform hubs 320.

The directive added to a data payload by an adapter 310, can be used by interconnect 330 to, among other things, determine the adapter to which the data container should be directed.

The directive can also be used by the adapter 310 that receives the data container from the interconnect 330. For example, the adapter 310 that receives the data container from interconnect 330 can examine the directive to determine whether an action should be performed. This adapter, based on the directive, may take any combination of the following actions: a quality of service action, a routing action, modify the data in the data payload, add a CRC to the data container, add virtual LAN tags to the data, decrypt the data payload, collect/gather further platform statistics (e.g., congestion information, usage statistics) to be used by other objects, etc.

Figure 4A:
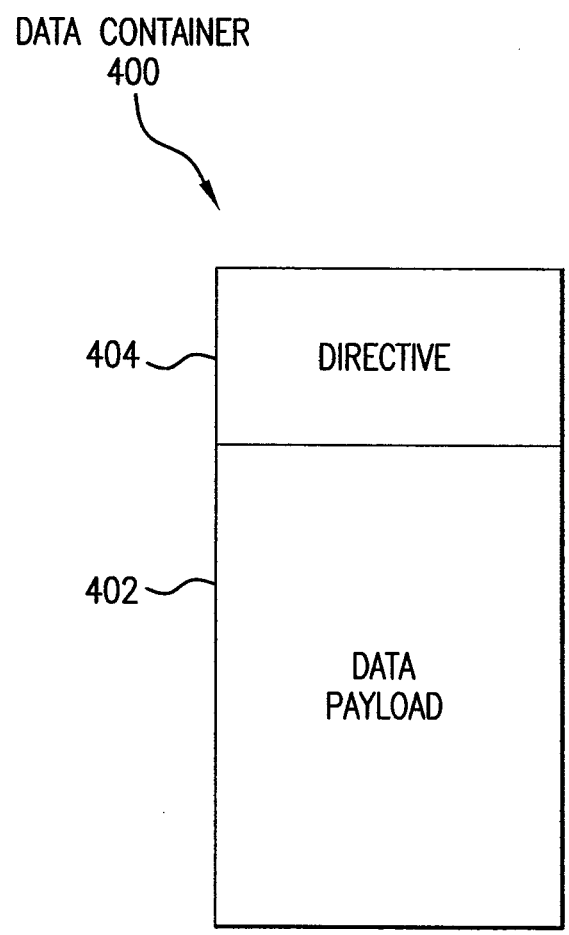
FIG. 4A illustrates an example data container.

FIG. 4A illustrates a data container 400 according to some embodiments of the invention. As shown in FIG. 4A, data container 400 includes a data payload 402 that was produced by an agent 110 and a directive 404 that was added to the payload 402 by the adapter 310 connected to the agent 110, which adapter 310 received the payload 402 from the agent 110. In the example shown in FIG. 4A the directive 404 is attached to the head of the data payload 402, but it may also be attached at other locations, such as the tail.

The directive 404 may be a simple bit vector. But, in some embodiments, it is a program-oriented structure because such a structure may be more efficient, especially in an in-line distributed classification architecture. In the embodiments in which the directive has a program oriented structure, the directive may include a set of instructions that can be random-accessed and/or stack-like accessed.

Figure 4B:
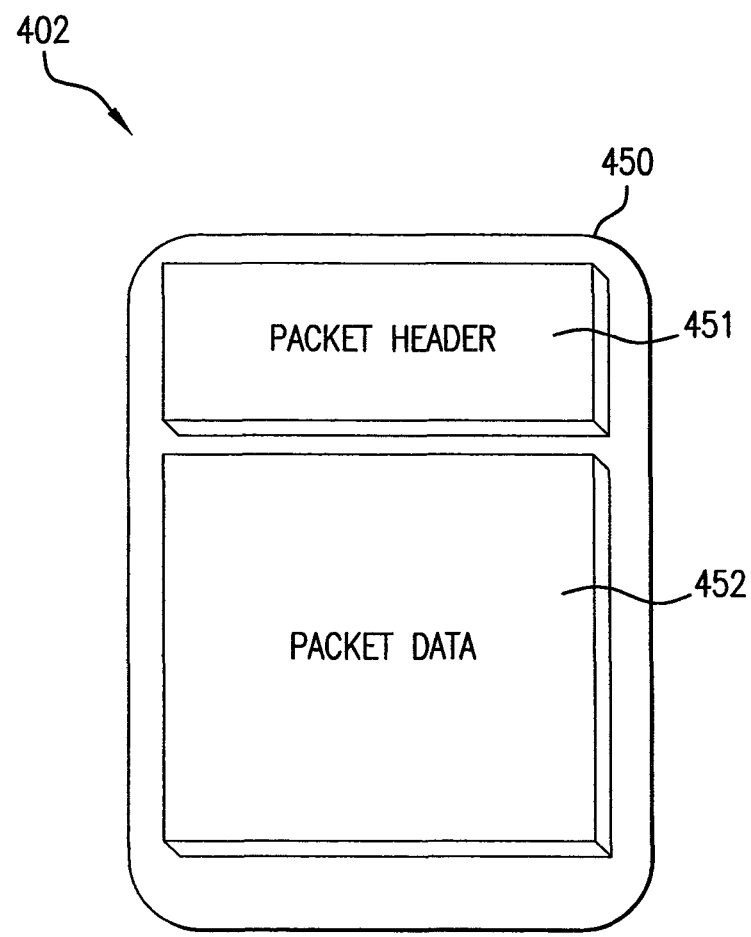
FIG. 4B illustrates an example protocol packet.

FIG. 4B illustrates an example data payload 402. In the example shown in FIG. 4B, data payload 400 is a protocol packet 450, which packet 450 includes a packet header portion 451 and a protocol packet data payload portion 452.

Figure 5A:
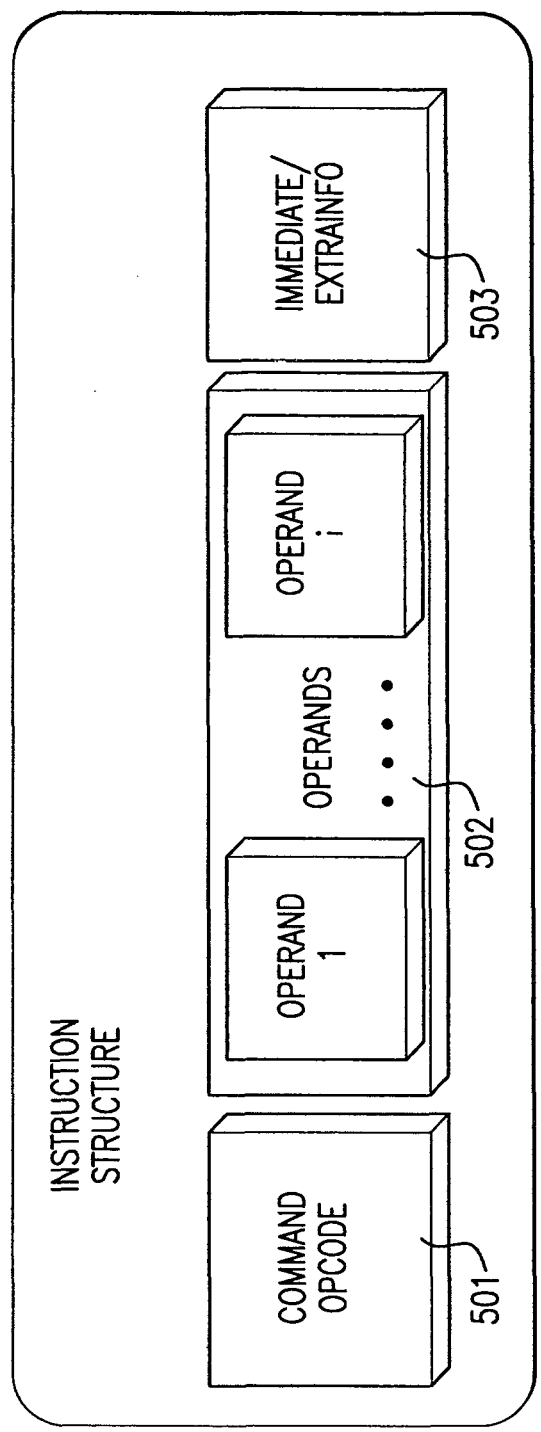
FIG. 5A illustrates an example instruction structure.

The set of instructions attached to a data payload by an adapter 310 may form a sequence of operations to be performed on the data payload. FIG. 5A illustrates one example of the structure of such functions. As illustrated in FIG. 5A, an instruction may include three parts: (1) a command operation code ("command Opcode") 501; (2) operands 502; and (3) immediate information 503.

Figure 5B:
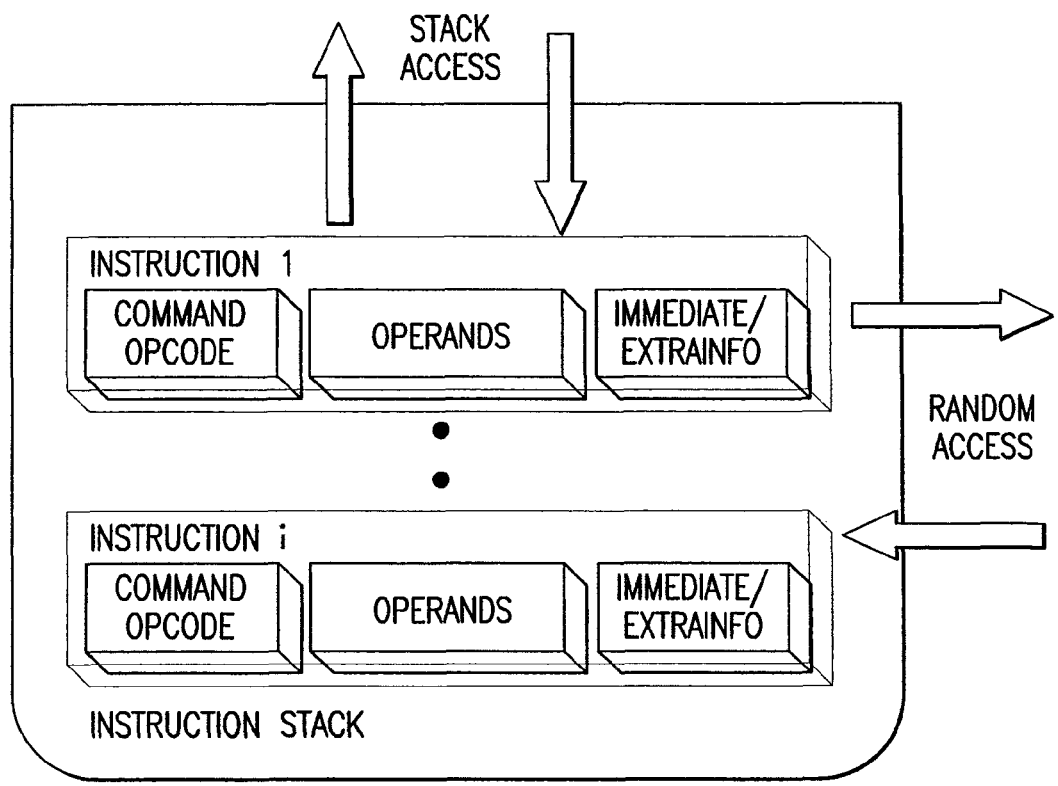
FIG. 5B illustrates two way in which an instruction may be accessed.

In some embodiments, the directive may include a list of instructions. The instructions in the list may be accessed randomly or stack based, as illustrated in FIG. 5B. There may be advantages to stack based access of the instructions. For example, each adapter 310 that receives a data container can pop the top instruction in an O(1) of time. It then can perform the action required by the popped instruction. It can also use the instruction in order to pass an instruction to an adapter through a dedicated control path. When the packet returns from the adapter, the adapter can add an operation to the top of the stack by pushing it into the directive in an O(1) amortized time. Adding an instruction to the top of the stack enables each adapter to decide to spread its task over a set of other adapters without affecting the rest of the exaction path. The directive stack-like implementation resembles a CPU software stack in most systems. It enables performing sub-routines without harming the upper level execution flow. Random Access to the instruction set enables out-of-order execution and insertion.

Figure 6:
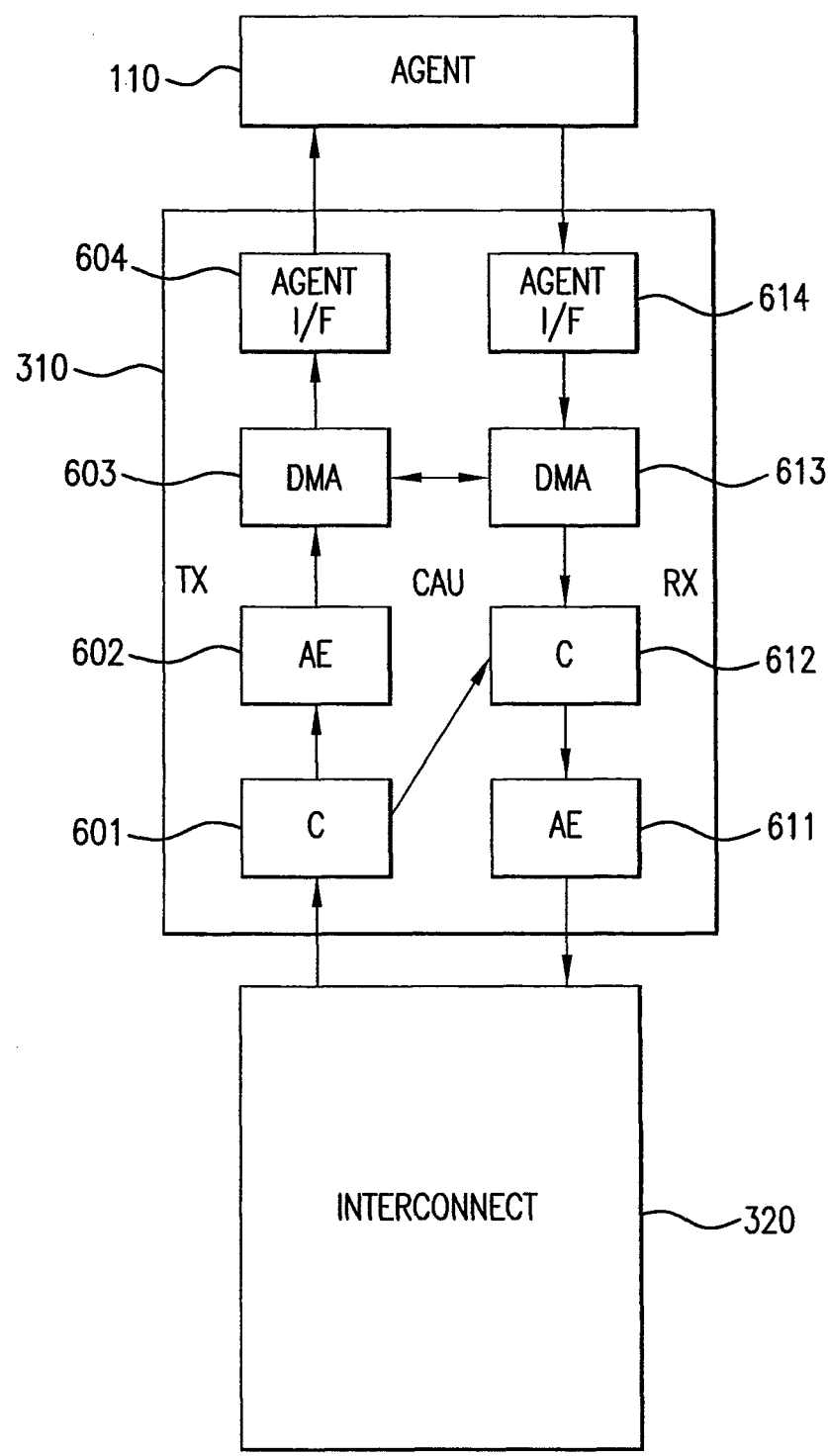
FIG. 6 is a functional block diagram of a classification adapter unit according to one embodiment.

Referring now to FIG. 6, FIG. 6 illustrates a functional block diagram of an adapter according to some embodiments of the invention. As illustrated in FIG. 6, the adapter may include two distinct data paths, a transmit (TX) data path and a receive (RX) data path.

As further illustrated, the TX data path may include an agent interface 604 for interfacing the adapter 310 with an agent 110, a direct memory access (DMA) engine 603, an action engine (AE) circuit 602, and a classifier circuit 601. In the embodiment shown, classifier 601 is connected directly between interconnect 330 and AE 602; AE 602 is connected directly between classifier 601 and DMA 603; DMA 603 is connected directly between AE 602 and interface 604; and interface 604 is connected directly between DMA 603 and agent 110.

The RX data path includes an interface 614 for interfacing with agent 110, a DMA engine 613, a classifier 612, and an AE 611. In the embodiment shown, AE 611 is connected directly between interconnect 330 and classifier 601; classifier 612 is connected directly between AE 611 and DMA 613; DMA 613 is connected directly between classifier 612 and interface 614; and interface 614 is connected directly between DMA 613 and agent 110.

Although a specific arrangement is shown in FIG. 6, this is for illustration and should not limit the scope of the invention as it is contemplated that one or more of the illustrated components are optional. For example, in some embodiments the DMA is not used.

Agent interfaces 614 and 604 may be responsible for translation between an agent and the platform hub. This includes handshakes between the platform hub and the agent. For example, interface 614 may be configured to receive data from a particular type of agent and may format the data according to a predetermined format prior to providing the data to DMA 613. Because each agent 110 may provide data to an interface 614 in a different format, each agent interface 614 is designed specifically for the agent to which it interfaces. Accordingly, in some embodiments, agent interfaces 604 and 614 are modular such that they can be easily replaced. Agent interfaces 604, 614 may also encapsulate a physical link unit that is link-dependent (i.e., PCIe, HyperTransport, etc.).

In some embodiments, DMAs 603, 613 may be responsible for address translation between agents. Since some of the communication channels are not packet based, the DMA may convert all formats to packets and back. An example of the use of the DMA module in the adapter is the translation of disk read and writes to blocks of data (packet like) in the platform hub. When these packets are extracted from the platform hub the DMA on the memory side is responsible to translate the packets back to disk transactions. In some embodiments, the use of a DMA in the adapter prevents the need for tunnels between the different agents. When using the DMA, all traffic is converted to in-band traffic, forwarded through the platform hub and then transferred back to its original state. In some embodiments, DMAs, 603,613 send to and/or receive from an agent a command. For example, a DMA 603 may be operable to write data to a certain memory location and then send a command to an agent, which command may cause an interrupt to occur which causes the agent to read the data from the certain memory location. As another example, an agent may send a command to a DMA 613 that causes the DMA to read the data stored in a predefined memory location. More specifically, for example, an acceleration agent 110 that is configured to encrypt data may send a command to a DMA of an adapter unit 310 immediately after the acceleration agent encrypts the data and stores the data in a certain memory, thereby causing the DMA to retrieve the encrypted data from the memory. After retrieving the encrypted data, the DMA may provide the data to a classifier 612 for further processing as described herein.

As described above, a DMA can interact with an agent in various manners dependant on the nature of the agent. In general there could be 3 main logical connections between an agent and a DMA: (1) data buffers, (2) data descriptors, and (3) control. All connections may be used both ways, and in some agents only a subset or a variation of these exist. The control path between the DMA and the agent is used to pass commands, instructions and configurations between the two. Commands from the DMA to the agent can also trigger specific sub-units inside an agent. This is very useful to instruct the required specific sub-unit to perform the task at hand. Using the command path, the DMA can control not only the agent as a whole but also as a cluster of sub-units. For example, when a packet is sent to a processing agent that includes several processors, the packet may be sent to a memory of one of the processors. In such case, the DMA can send a control message which triggers an interrupt on this specific processor and indicates that it has a packet waiting for it. This provides a benefit by utilizing system resources in an optimized manner. A different example can be in an Acceleration Agent. In such a case, the DMA performs a write of a packet to the agent memory space using the data path. When it is finished writing the packet, it send the agent a control message that instructs the agent to start the designated operation on the packet. When the agent is done, the agent writes a control message to the DMA that the operation is finished and the DMA reads the packet back from the acceleration agent. In most of the cases in which there is no (or little use) of a command path, the agent may poll a data/descriptor memory area in order to act on each packet.

Classifier 612 may be configured to parse the data it receives from DMA 613, extract relevant fields from the data, and take an action (e.g., create or select a command) based, at least in part, on the relevant data fields. If classifier 612 selects or creates a command, the command may be passed to AE 611 and may instruct AE 611 to take a specific action. In addition to providing commands to AE 611, classifier 612 may also provide to AE 611 data it received from DMA 613.

Classifier 601 may be configured to receive data containers from interconnect 330 perform data classification based on the extraction of instructions included in the directive portion of a data container received from interconnect 330.

A classifier 601,612 can be implemented in various manners, however, in some cases each classifier 612 may include a parser and an identifier. The parser may be configured to classify a packet (IP/TCP/UDP etc. . . . ) and extract relevant fields from the packet, while the identifier may check the fields against relevant rules. Thus, in some embodiments, a classifier 612 may include a rules engine that implements a set of rules on a set of fields. In some embodiments, the output of a classifier is a list of commands accompanied by extra information, if necessary, that could be of use by the AEs or one of the agents.

The AEs 602,611 may perform actions as directed by a classifier or as instructed by a directive. Examples actions include: (1) adding a directive to a data payload, (2) dropping a protocol packet, (3) load balancing, (4) changing the payload content, etc.

In the example illustrated in FIG. 6, the classifiers 601 and 612 are shown as having the ability to directly communicate. Likewise the DMAs 603 and 613 are shown as having the ability to directly communicate. However, in some embodiments, any component of adapter 310 can have the ability to directly communicate with any other component of adapter 310.

Interconnect 330 enables connectivity between the different adapters. In some embodiments, interconnect 330 is a non-blocking switch that uses the data container as its only possible data structure. The interconnect itself is a kind of an engine as well, being capable to perform a "MOVE" instruction. Since the structure of the directive is a stacked list of instruction, a classifier can decide a multiple hops action. This will be done by inserting several "MOVE" instruction one after the other.

Referring now to the RX path of adapter 310, DMA 613 may receive a data payload from agent 110 via interface 614 and provides the data payload to classifier 612. In response to receiving the data payload from DMA 613, classifier 612 may examine the data payload and then pass to AE 611 the data payload along with classification information that is used by AE 611 to create a directive to add to the data payload. This classification information may be passed out-of-band to AE 611. The classification information may depend on the contents of the payload. For example, classifier 612 may examine one or more fields of the data payload, and, depending on the data in those fields, select certain commands to include in the classification information sent to AE 611.

In response to receiving from classifier 612 the data payload and classification information, AE 611 may be configured to create a directive and add the directive to the data payload, thereby creating a data container. The directive created by AE 611 may depend on the classification information it received from classifier 612. After creating the data container, AE 611 may provide the data container to interconnect 330, which may be configured to route the data container to an adapter 310 specified in the directive.

Referring now to the TX path of adapter 310, as discussed above, classifier 601 may receive data containers 600 from interconnect 330 and may add and/or remove information from the container's directive 604. After classifier 601 is finished processing a received data container 600, it may pass the data container 600 to AE 602. AE 602 may perform steps depending on the information contained in the data container's directive and/or depending on commands received from classifier 601. For example, AE 602 may pass the container's data payload to DMA 603. AE 620 may also send out-of-band control information to DMA 603. DMA 603 receives data payloads from AE 602 and provides the received data payloads to agent 110 via interface 604.

Figure 22:
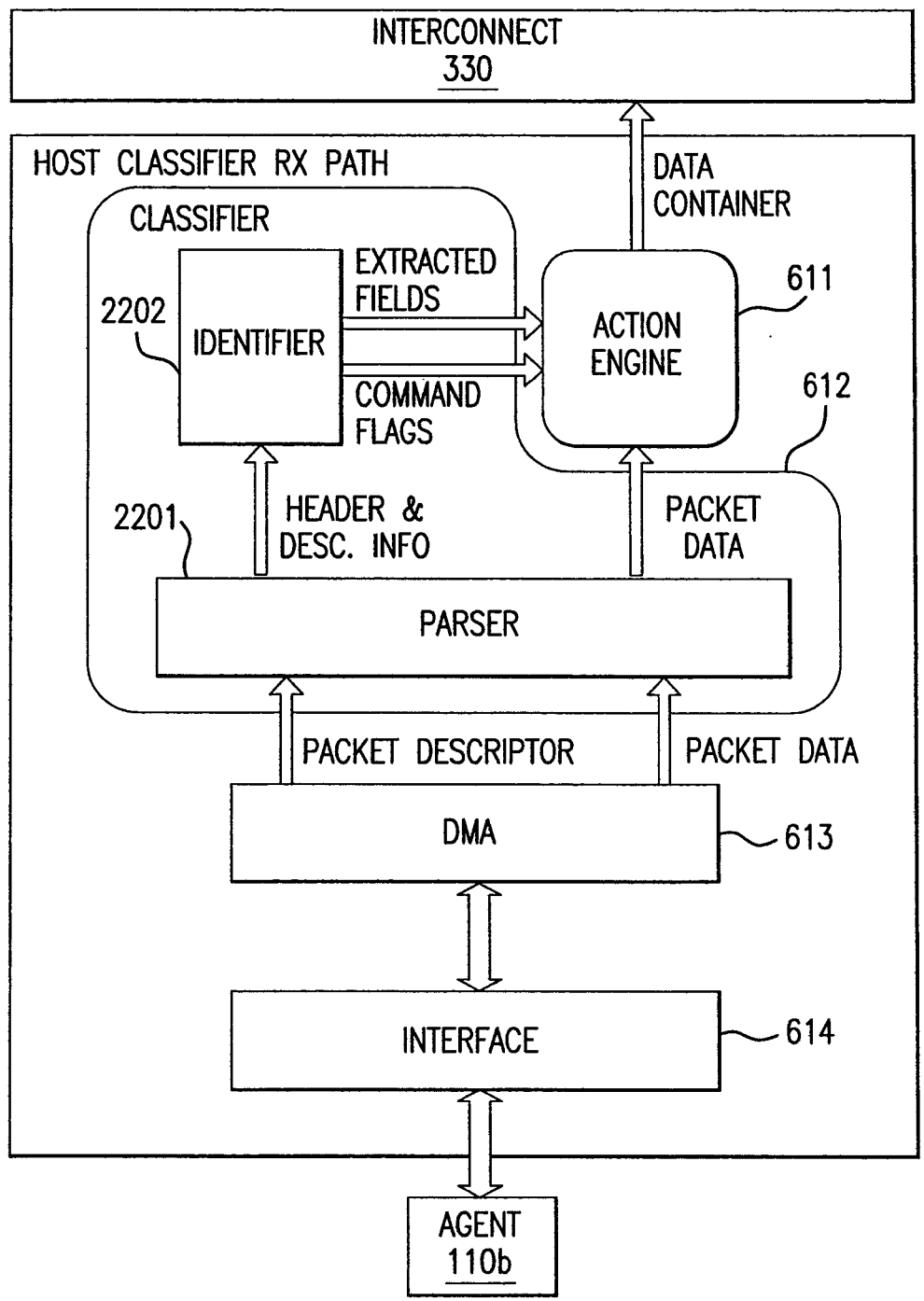
FIG. 22 illustrates an example classification adapter unit.

Referring now to FIG. 22, FIG. 22 illustrates an example RX path of an adapter 310 that is connected to a processing agent 110b. In the example shown, we shall assume that DMA 613 obtains a packet descriptor from a memory unit of agent 110b and obtains a protocol packet from a memory unit of agent 110b, wherein the protocol packet is associated with the packet descriptor. The packet descriptor may contain a set of fields. For example, the packet descriptor may includes the following data fields: packet size field that identifies the size of the protocol packet, a destination port field that identifies a destination for the protocol packet, a quality of service field that may identifier a packet queue; a CPU identifier; etc.

After the DMA 613 obtains the packet descriptor and protocol packet, it may pass the packet descriptor to a parser 2201 of classifier 612 using a first bus 2210 and may pass the protocol packet to the parser 2201 using a second bus 2211.

Parser 2201 may be configured to extract fields from the packet descriptor and may be configured to extract fields from the header of the protocol packets. The Extracted fields may be provided to an identifier 2202 and the protocol packet may be provided to the action engine 611.

Identifier 2202 may be configured to compare a field received from parser 2201 to configuration data to determine an action that should be taken. Based on the determined action, the identifier 2202 may send a command to the action engine 611. Identifier 2202 may also provide to the action engine 611 the extracted fields.

For example, if identifier 2202 determines that the destination port of the protocol packet is port #2, then identifier 2202 may determine that it should send a "merge" command to the action engine 611. As discussed above, action engine 611 may perform the action and may create a data container, which is then provided to interconnect 330.

FIRST EXAMPLE

Figure 7:
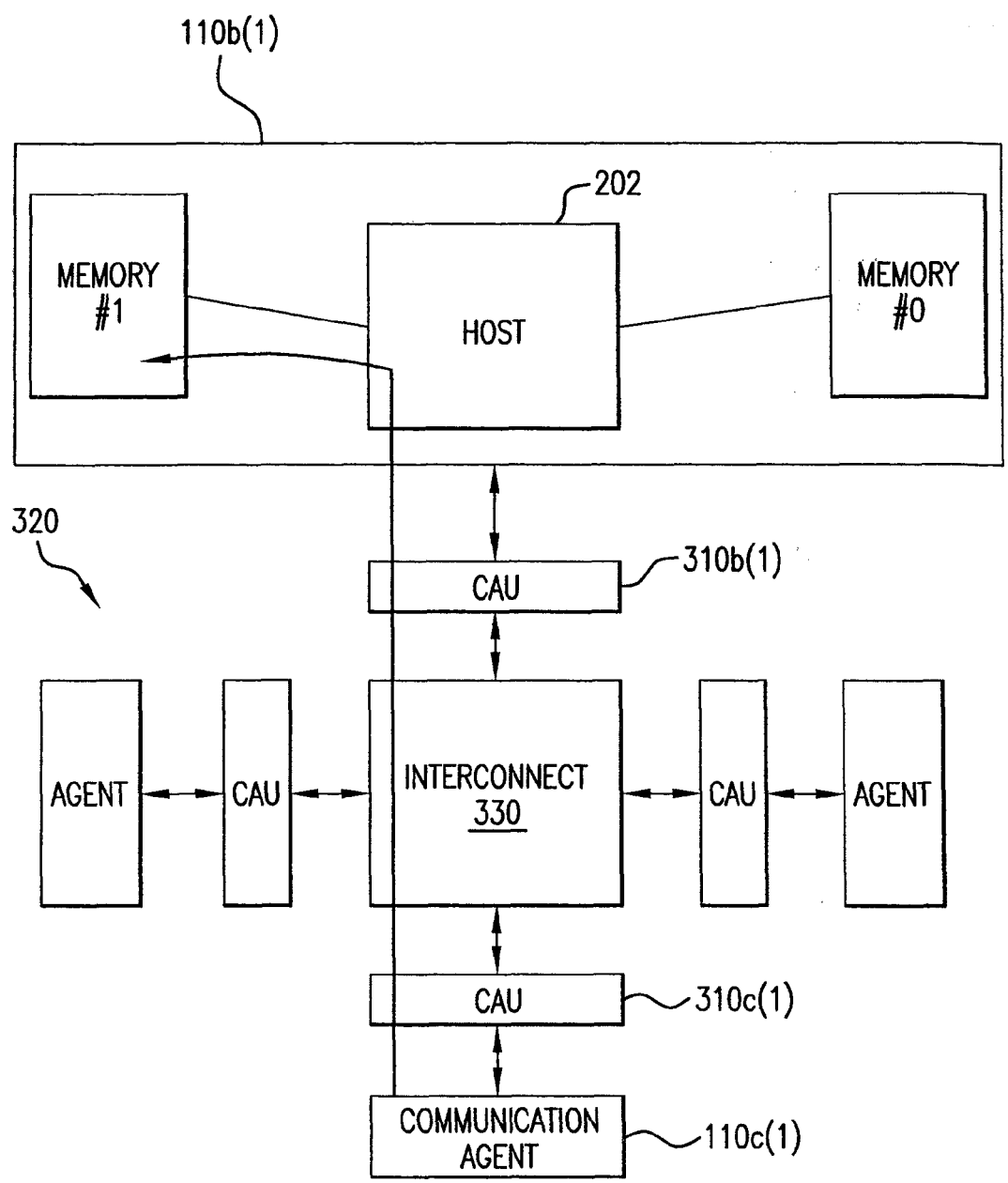
FIG. 7 illustrates an example data flow.
Figure 8:
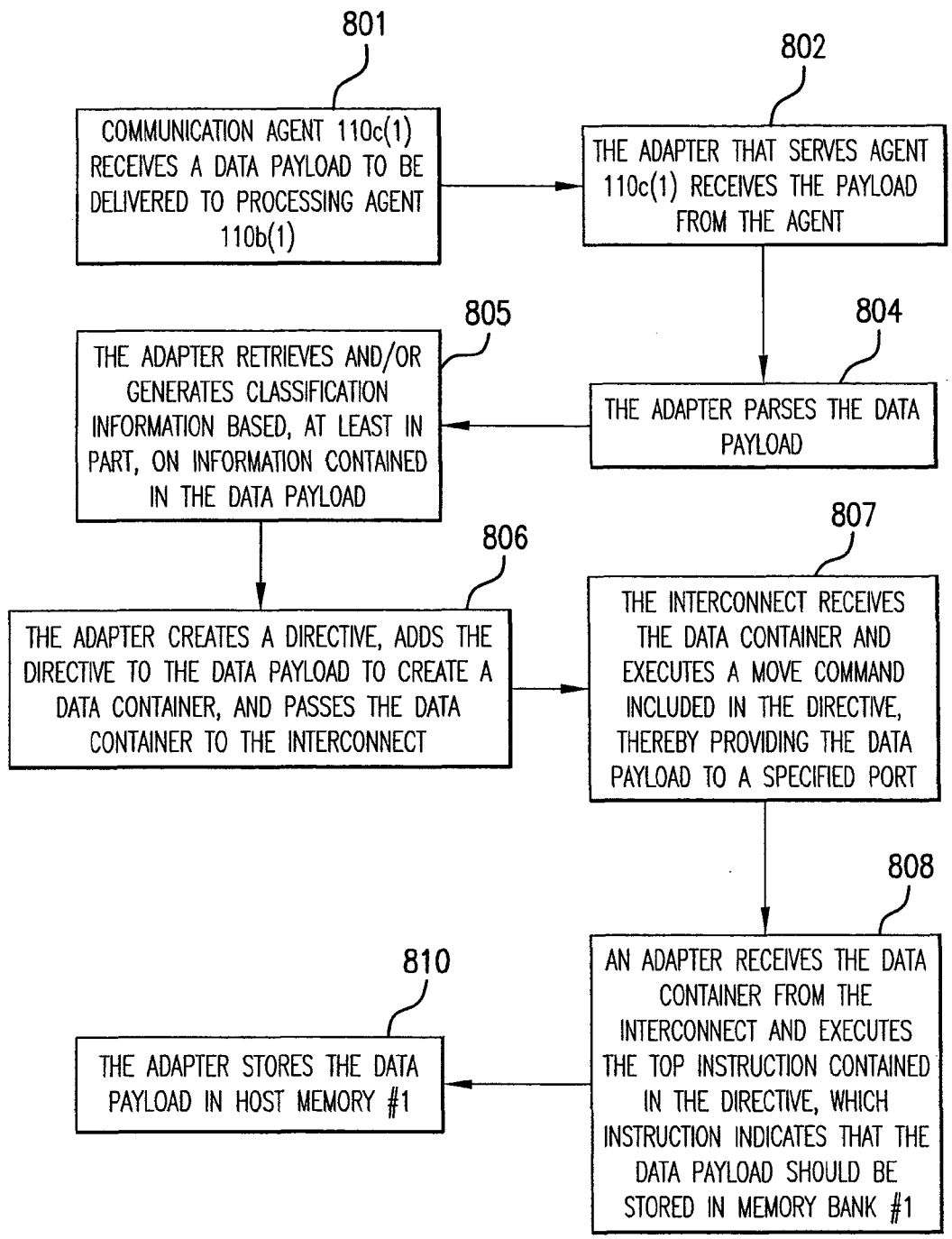
FIG. 8 is a flow chart illustrating a process according to an embodiment of the invention.

Referring now to FIGS. 7 and 8, FIG. 7 shows an example flow of data through platform hub 320 and FIG. 8 is a flow chart describing the steps of the data flow. The example data flow begins in step 801, wherein the communication agent 110c(1) receives a data payload to be delivered to processing agent 110b(1). For example, communication agent 110c(1) may receive a TCP/IP packet from a network and this TCP/IP packet may need to be delivered to processing agent 110b(1) so that the packet can be processed.

In step 802, the adapter that serves agent 110c(1) (i.e., adapter 310c(1)) receives the payload from agent 110c. In step 804, the adapter parses the data payload (e.g., the adapter examines the header of the TCP/IP packet) to determine the stream or connection to which the packet belongs (in this example, we shall assume the packet belongs to stream N). One objective of adapter 310c may be to perform such classification operation in a persistent manner, hence sending packets of the same logical and operational characteristics (need similar operations to be performed upon them) to the same processing agent 110b.

In step 805, the adapter retrieves and/or generates certain classification information in response to determining that the packet belongs to stream number N. That is, the classification information that is generated/received depends, at least in part, on the fact that the packet belongs to stream N.

Figure 9:
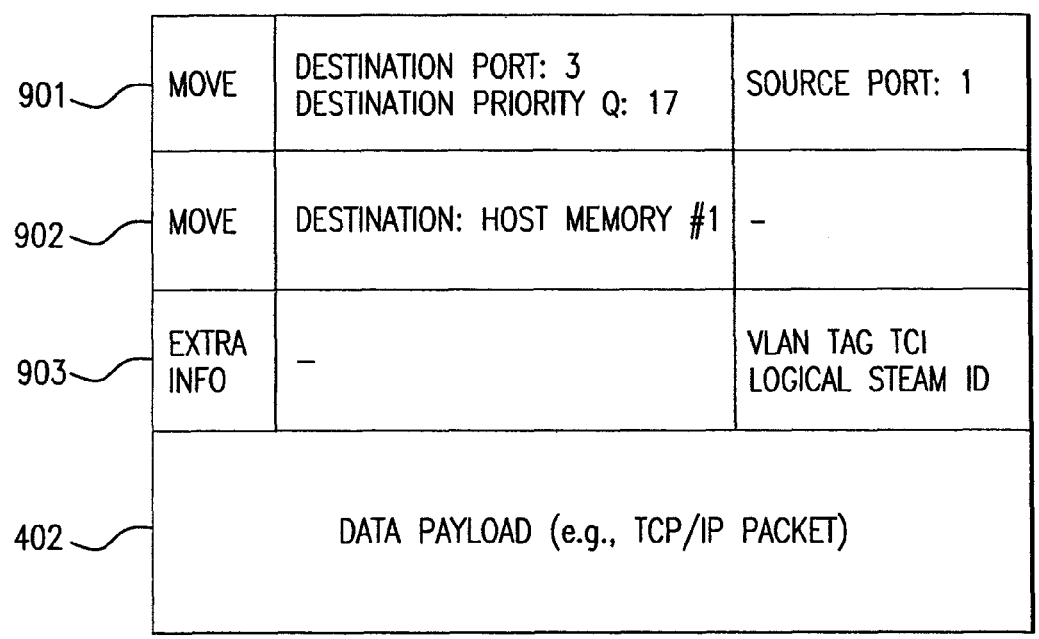
FIG. 9 illustrates an example data container.

In step 806, the adapter performs the following steps: (1) creates a directive that includes all the relevant data that was gathered/created in step 805, if any, along with a list of instructions to be performed on the data payload, (2) adds the directive to the head of the data payload, thereby creating a data container, and (3) passes the data container to interconnect 330. FIG. 9 illustrates an example directive that may be created in step 806. The example directive includes two move instructions 901 and 902 and an extra information record 903.

In step 807, interconnect 330 receives the data container from adapter 310c(1) and removes instruction 901 from the directive and routes the data container to the port identified in move command 901 (i.e., port #3), which is the port to which the adapter for processing agent 110b(1) is attached.

In step 808, adapter 310b(1) receives the data container from interconnect 330, pops the second move instruction (i.e., instruction 902) from the directive, which instruction indicates the ultimate destination for the data payload (i.e., host memory #1 in this example).

In step 810, the adapter 310b(1) causes the data payload to be stored in host memory #1 and also causes at least some of the information contained in record 903 to be stored in a predefined descriptor storage area, which may be in host memory #1.

Figure 10:
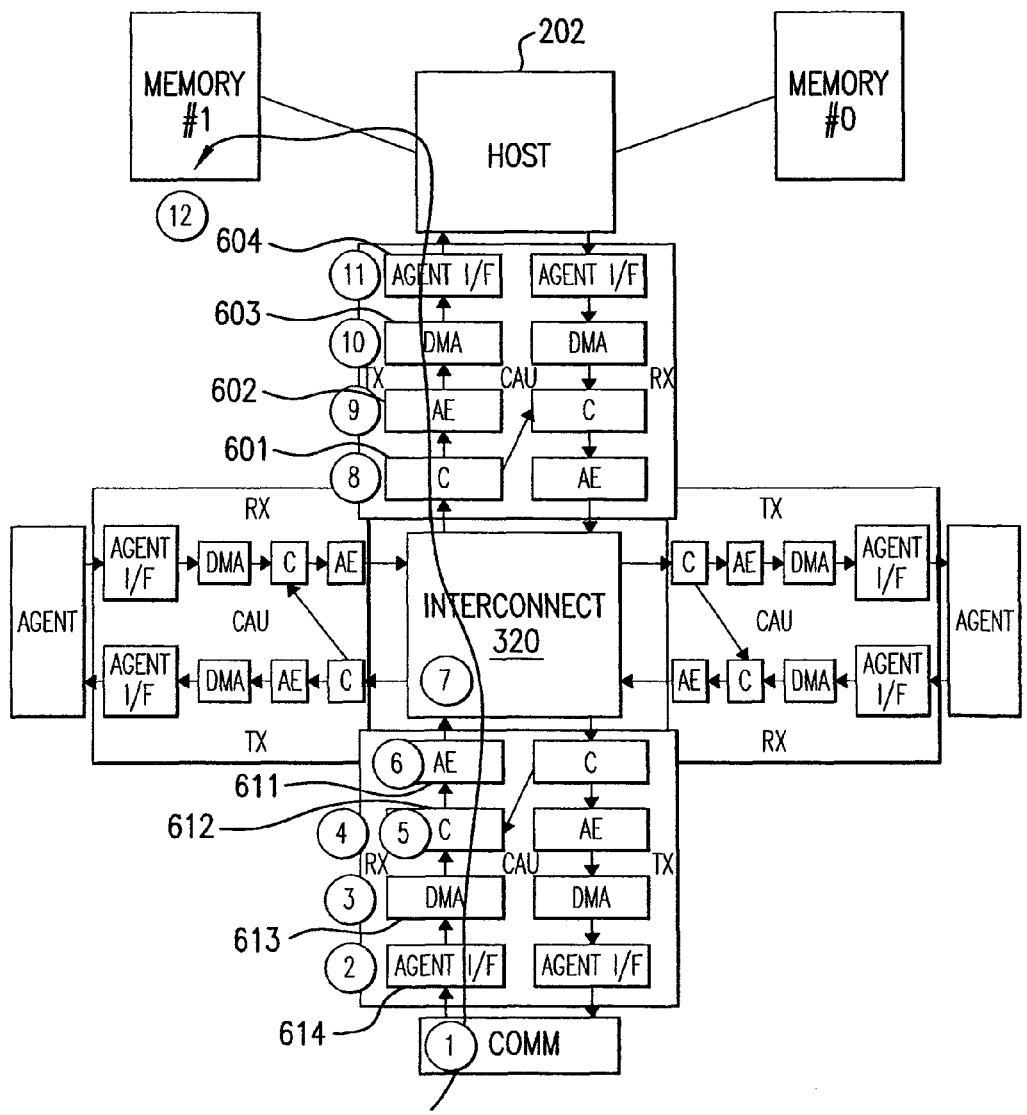
FIG. 10 illustrates an example data flow.
Figure 11:
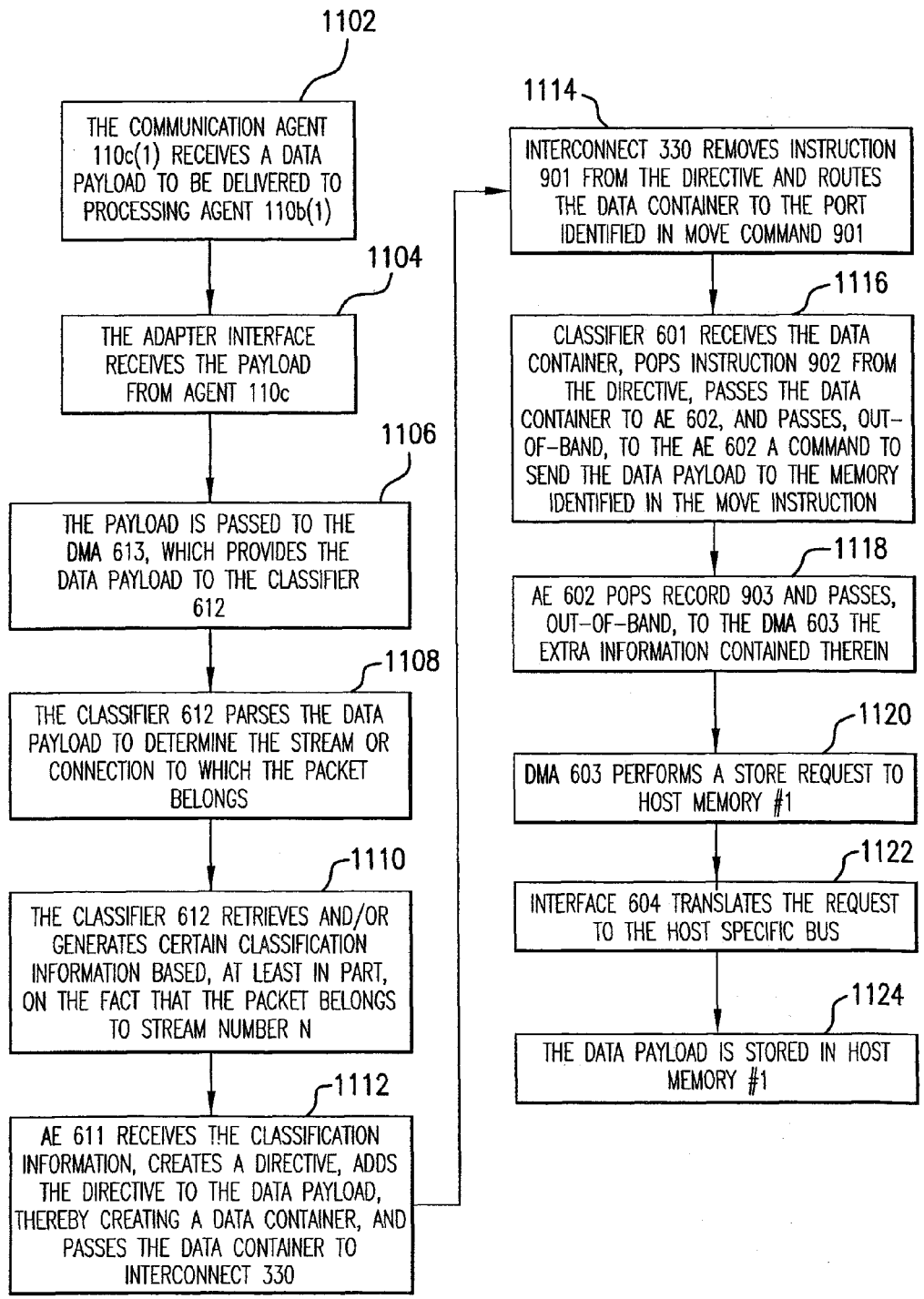
FIG. 11 is a flow chart illustrating a process according to an embodiment of the invention.

Referring now to FIGS. 10 and 11, FIG. 10 shows an example implementation of the data flow shown in FIG. 7 and FIG. 11 is a flow chart describing the steps of the example implementation.

The data flow begins in step 1102, wherein the communication agent 110c(1) receives a data payload to be delivered to processing agent 110b(1). For example, communication agent 110c(1) may receive a TCP/IP packet from a network and this TCP/IP packet may need to be delivered to processing agent 110b(1) so that the packet can be processed.

In step 1104, the interface (e.g. an Ethernet Mac interface) receives the payload from agent 110c and translates the information from $1^{st}$ layers.

In step 1106, the payload is passed to the DMA 613, which in this simple scenario doesn't need to perform any batch operation (in a more complicated example it could decide for instance to perform a back-up write operation to a storage device while passing the data to the classifier), and DMA 613 passes the data payload to classifier 612.

In step 1108, the classifier 612 parses the data payload to determine the stream or connection to which the packet belongs (in this example, we shall assume the packet belongs to stream number N).

In step 1110, the classifier 612 retrieves and/or generates certain classification information based, at least in part, on the fact that the packet belongs to stream number N. It then passes, out-of-band, to AE 611 the classification information and also passes the data payload to AE 611.

In step 1112, AE 611 receives the classification information, creates a directive that includes all the relevant data that was gathered through out the classification phase along with a list of instructions to be performed on the data payload, adds the directive to the head of the data payload, thereby creating a data container, and passes the data container to interconnect 330.

In step 1114, interconnect 330 removes instruction 901 from the directive and routes the data container to the port identified in move command 901 (i.e., port #3), which is the port to which the adapter for host 202 is attached.

In step 1116, classifier 601 receives the data container from interconnect 330, pops the second move instruction (i.e., instruction 902) from the directive, which instruction indicates the ultimate destination for the data payload (i.e., host memory #1 in this example), passes the data container to AE 602, and passes, out-of-band, to the AE 602 a command to send the data payload to the memory identified in the move instruction (i.e., host memory #1).

In step 1118, AE 602 pops record 903 and passes, out-of-band, to the DMA 603 the extra information contained therein. In step 1120, DMA 603 performs a store request to host memory #1 of all packet data. The extra information is sent to a predefined descriptor area also in host memory #1. In step 1122, interface 604 translates the request to the host specific bus. In step 1124, data payload is stored in host memory #1.

The scalable structure of platform hub 320 enables fast, efficient and scalable control over the system platform agents.

By using the directive structure, control signals in the system can be passed as in-band messages (in fact, signals can be even sent as piggy-backed information upon existing traffic in the opposite direction). An example of a control messages is an instruction from host 202 to one or more classifiers 612 to watch out for a new virus. In such scenario, host 202 sends a message to some or all adapters 310, in a request to update their tables according to the new classification scheme. Host 202 can update the adapters 310 by performing a memory-mapped-io-write to the adapters or by sending a control packet with a predefined packet format.

SECOND EXAMPLE

Figure 12:
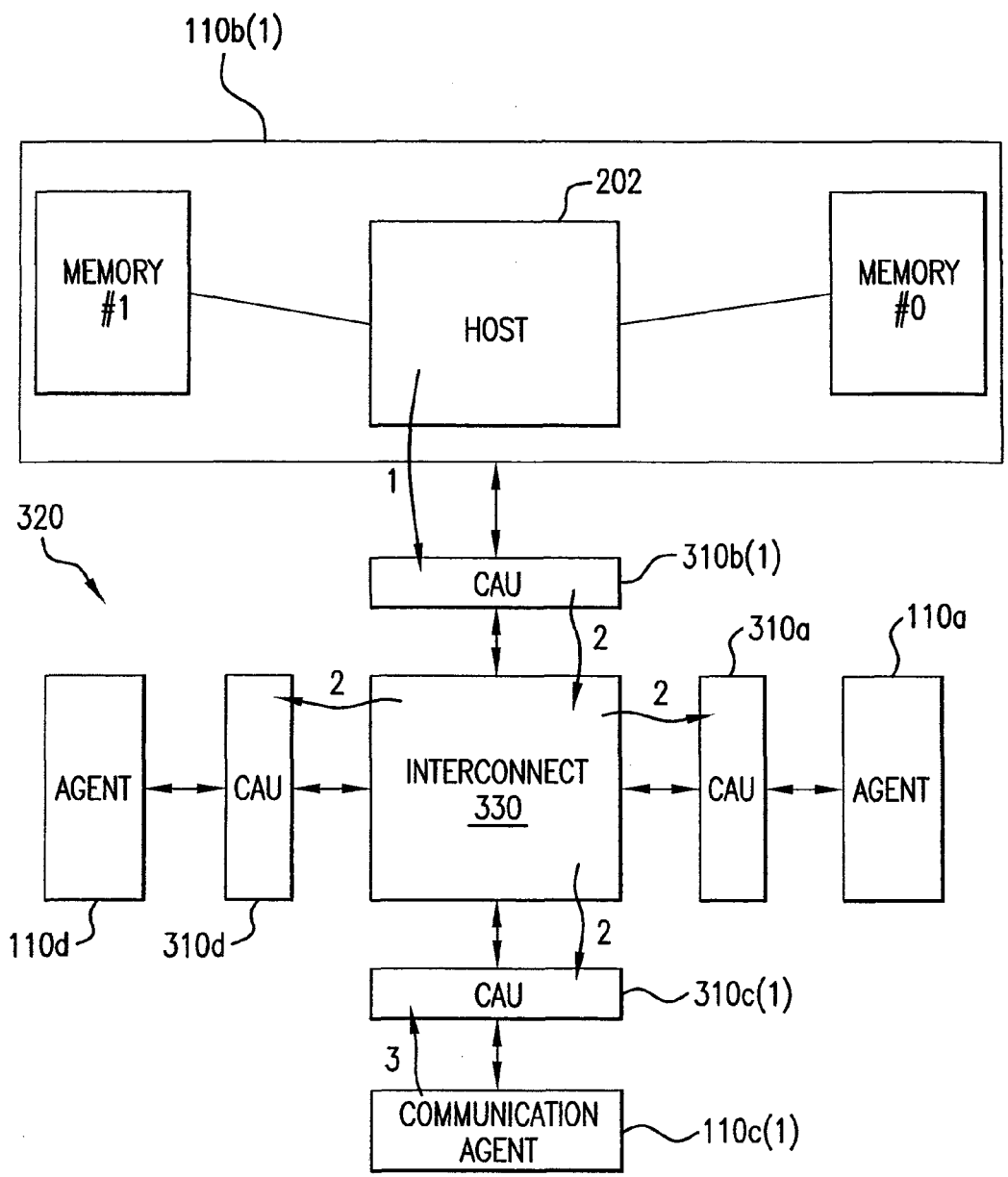
FIG. 12 illustrates an example data flow.
Figure 13:
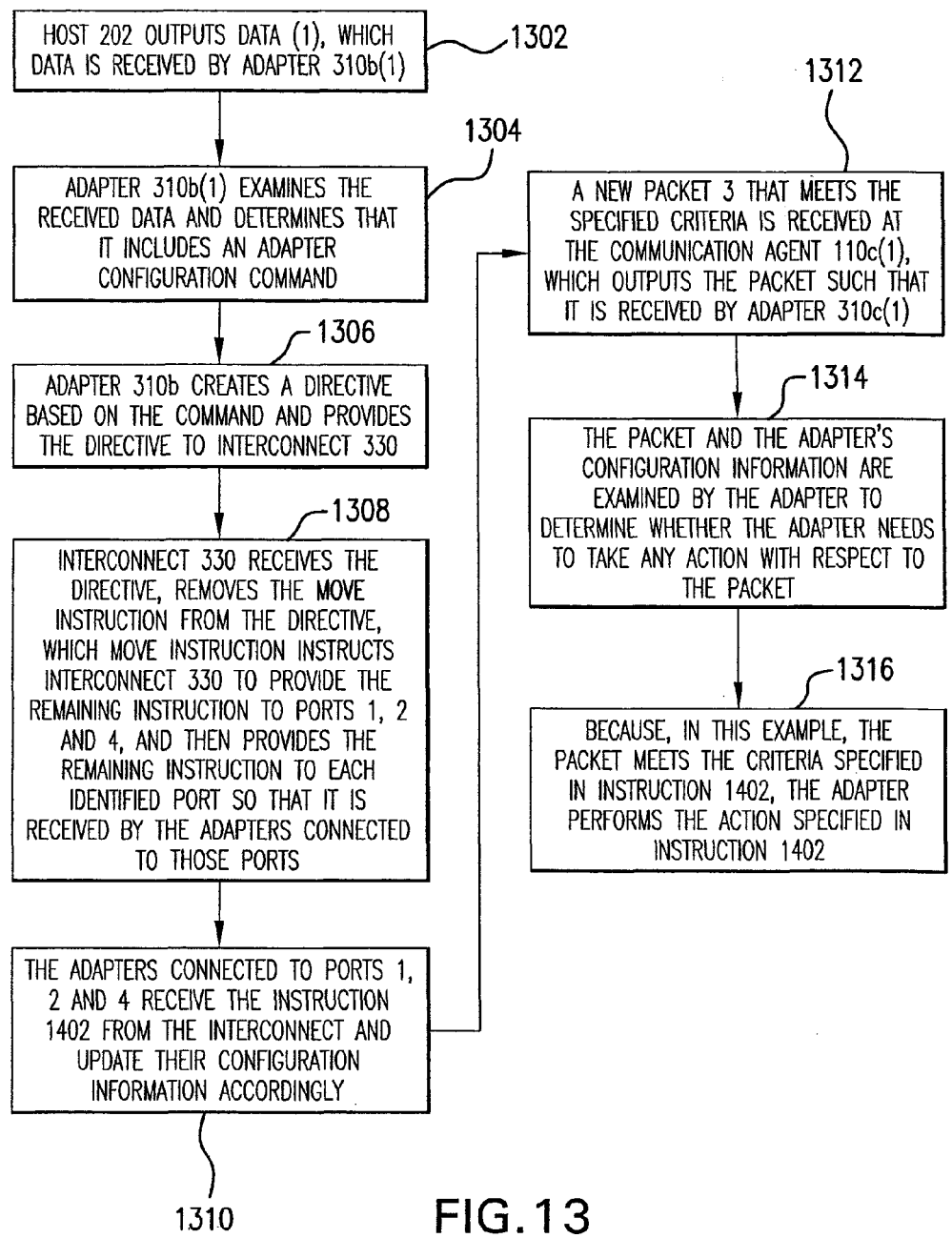
FIG. 13 is a flow chart illustrating a process according to an embodiment of the invention.

Referring now to FIGS. 12 and 13, FIG. 12 shows another example flow of data through platform hub 320 and FIG. 13 is a flow chart describing the steps of data flow.

Referring to FIG. 13, in step 1302, host 202 outputs data (1), which data is received by adapter 310b(1). In this example, the data includes an adapter configuration command or "management packet" that should be sent to other adapters (e.g., adapters 310a, c, d).

In step 1304, adapter 310b(1) examines the received data and determines that it includes an adapter configuration command. Because the data includes an adapter configuration command, adapter 310b(1) creates a certain directive (2) and provides the directive to interconnect 330 (step 1306). In some embodiments, the directive is provided to interconnect 330 by piggybacking on existing packet streams. That is, in some embodiments, the directive is added to a data payload to create a data container, and the data container is sent to interconnect 330.

Figure 14:
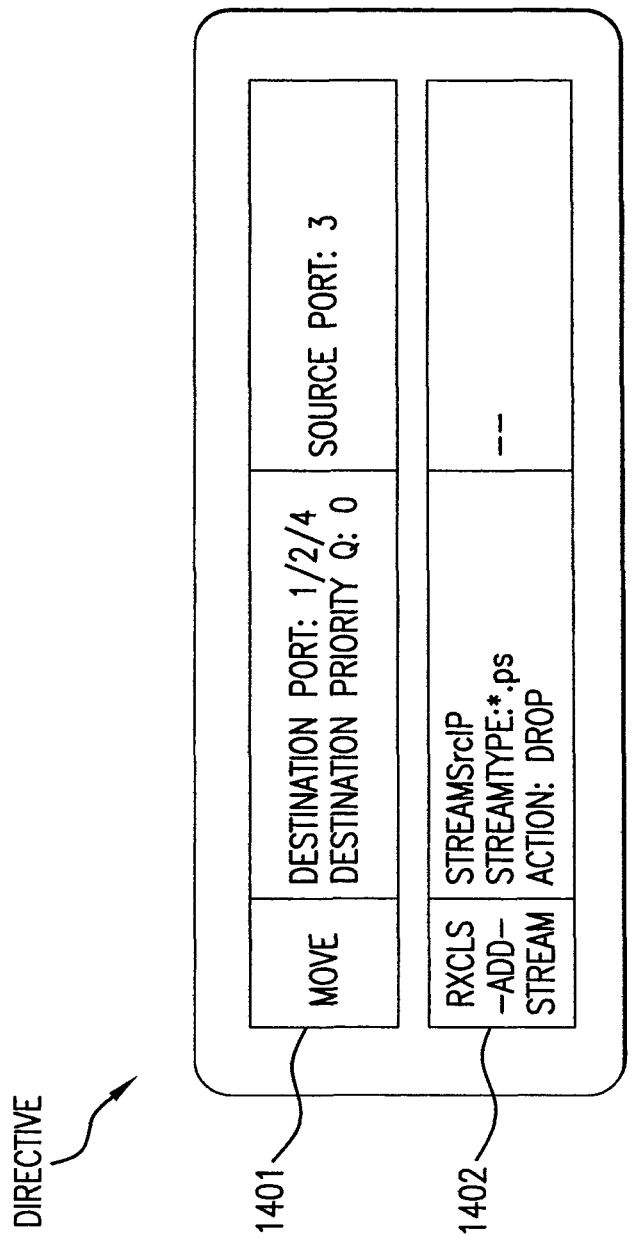
FIG. 14 illustrates an example directive.

FIG. 14 illustrates an example directive that may be created in step 1304. As illustrated in FIG. 14, the directive created in step 1304 may include two instructions: (1) an instruction for the interconnect 330 (instruction 1401, which in this example is a MOVE instruction) and (2) another instruction for the other adapters (instruction 1402).

In step 1308, interconnect 330 receives the directive, removes (pops) the MOVE instruction from the directive, which move instruction instructs interconnect 330 to provide the remaining instruction to ports 1, 2 and 4, and then provides the remaining instruction to each identified port so that it is received by the adapters connected to those ports.

In step 1310, the adapters connected to ports 1, 2 and 4 (i.e., adapters 310a, 310c(1) and 310d in this example) receive the instruction 1402 from the interconnect and update their configuration information (e.g., configuration tables) accordingly. In this example, the instruction tells the adapters to drop a packet if the packet meets a certain criteria specified in instruction 1402.

In step 1312, a new packet 3 that meets the specified criteria is received at the communication agent 110c(1), which outputs the packet such that it is received by adapter 310c(1). When this packet reaches adapter 310c(1), the packet and the adapter's configuration information are examined by the adapter to determine whether the adapter needs to take any action with respect to the packet (step 1314). Because, in this example, the packet meets the criteria specified in instruction 1402 (e.g., the packet is a malicious packet), the adapter performs the action specified in instruction 1402 (i.e., the adapter drops the packet) (step 1316).

Figure 15:
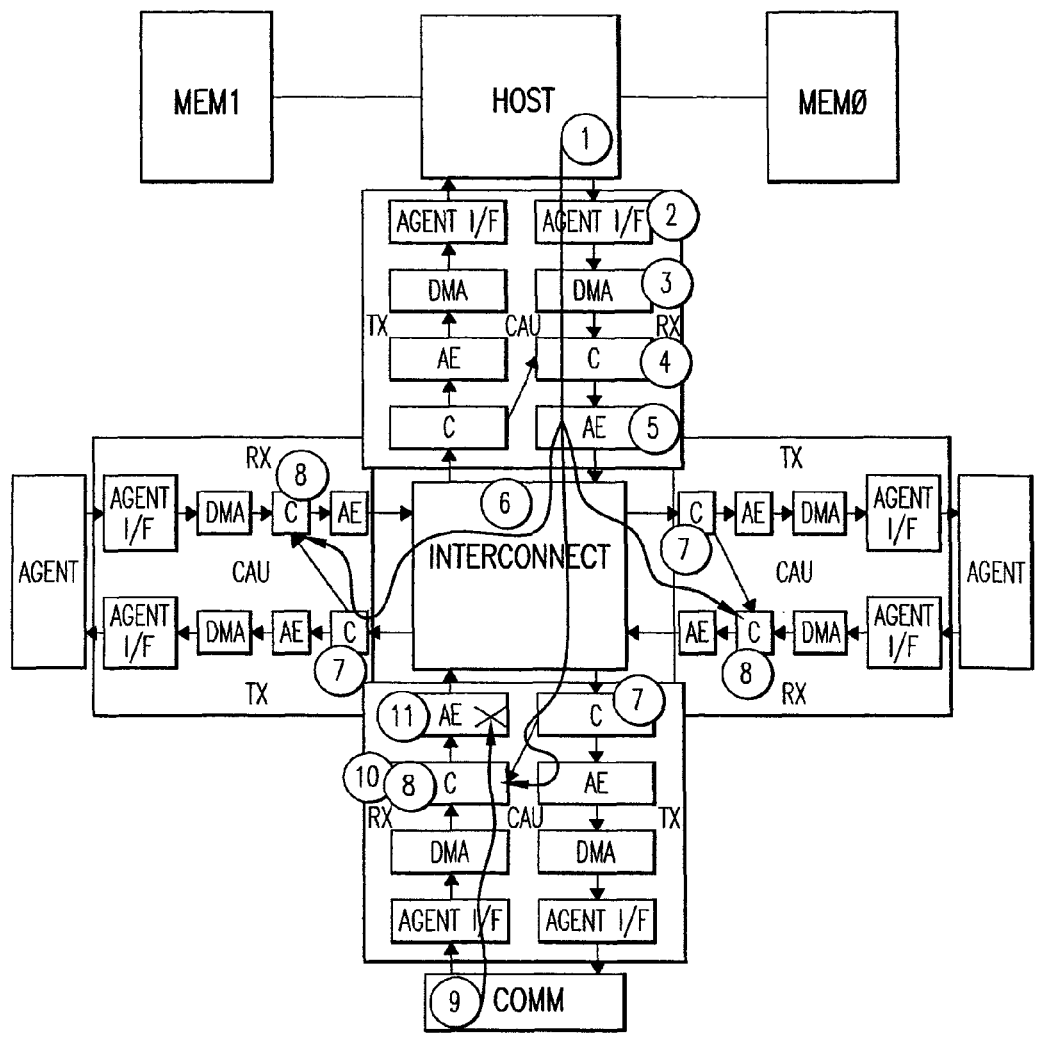
FIG. 15 illustrates an example data flow.
Figure 16:
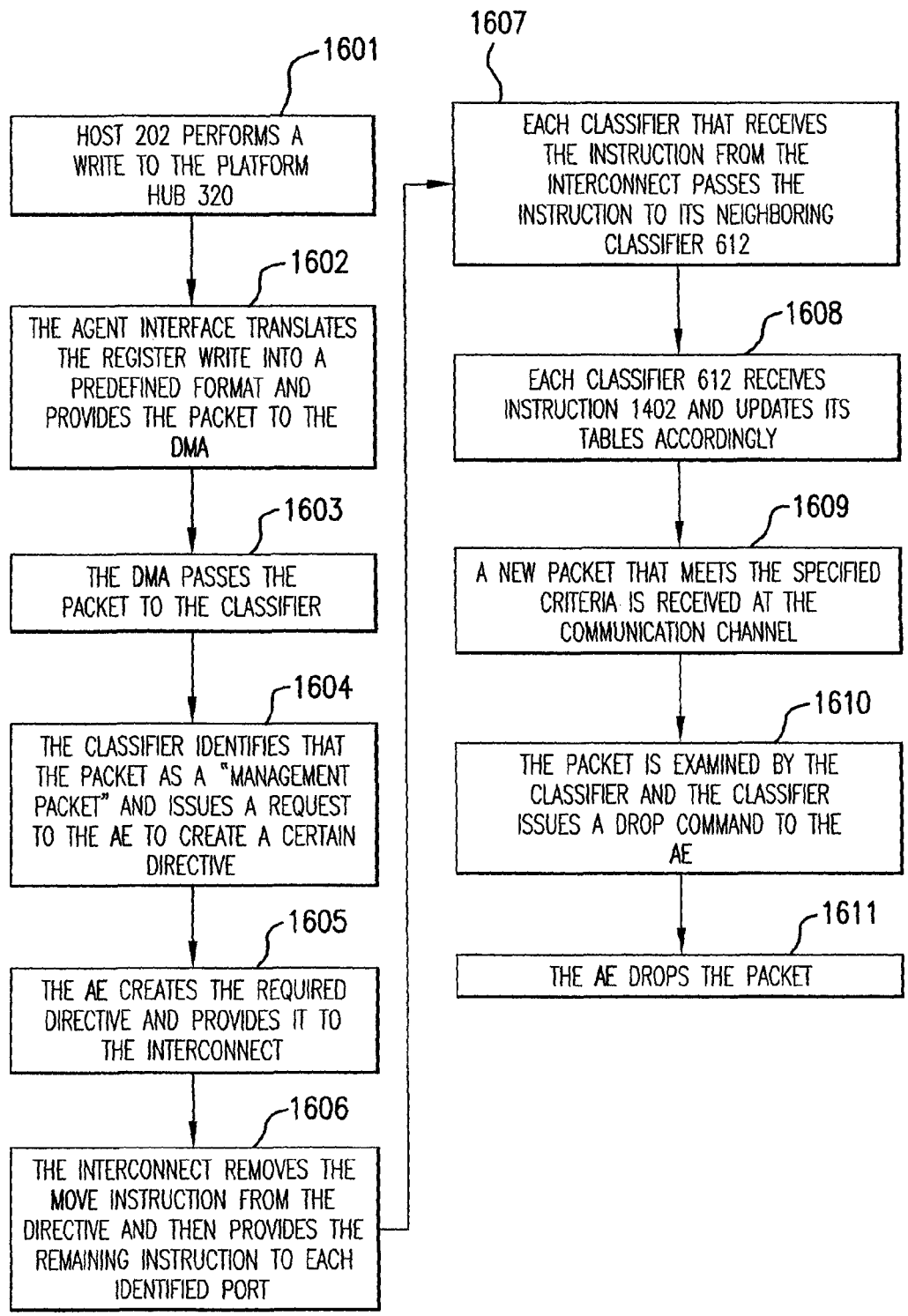
FIG. 16 is a flow chart illustrating a process according to an embodiment of the invention.

Referring now to FIGS. 15 and 16, FIG. 15 shows an example implementation of the data flow shown in FIG. 12 and FIG. 16 is a flow chart describing the steps of the example implementation.

In step 1601, host 202 performs a write to the platform hub 320. In step 1602, the agent interface connected to host 202 translates the register write into a predefined-format (e.g., a fixed-length packet) and provides the packet to the DMA to which it is connected. In step 1603, the DMA passes the packet to the classifier to which the DMA is connected.

In step 1604, the classifier examines the packet and identifies that the packet as a "management packet". The classifier then issues a request to the AE to create a certain directive and provide the directive to interconnect 330. In step 1605, the AE creates the required directive and provides it to interconnect 330.

In step 1606, interconnect 330 receives the directive, removes (pops) the MOVE instruction from the directive, which move instruction instructs interconnect 330 to provide the remaining instruction to ports 1, 2 and 4, and then provides the remaining instruction to each identified port so that it is received by classifier 601 in each of the other three adapters.

In step 1607, each classifier 601 in the other adapters receives the instruction 1202 from the interconnect and identifies that the instruction should be sent to its neighboring classifier 612. Each classifier 601 then passes the instruction to its neighboring classifier 612. In step 1608, each classifier 612 receives instruction 1402 and updates its tables accordingly. In this example, the instruction tells classifier 612 to drop a packet if the packet meets a certain criteria specified in instruction 1402.

In step 1609, a new packet that meets the specified criteria is received at the communication channel. When this packet reaches the classifier 612 of adapter 310c(1), the packet is examined by the classifier and the classifier issues a drop command to the AE because the packet meets the specified criteria (i.e., it is a malicious packet) (step 1610). The AE then drops the malicious packet (step 1611).

THIRD EXAMPLE

Figure 17:
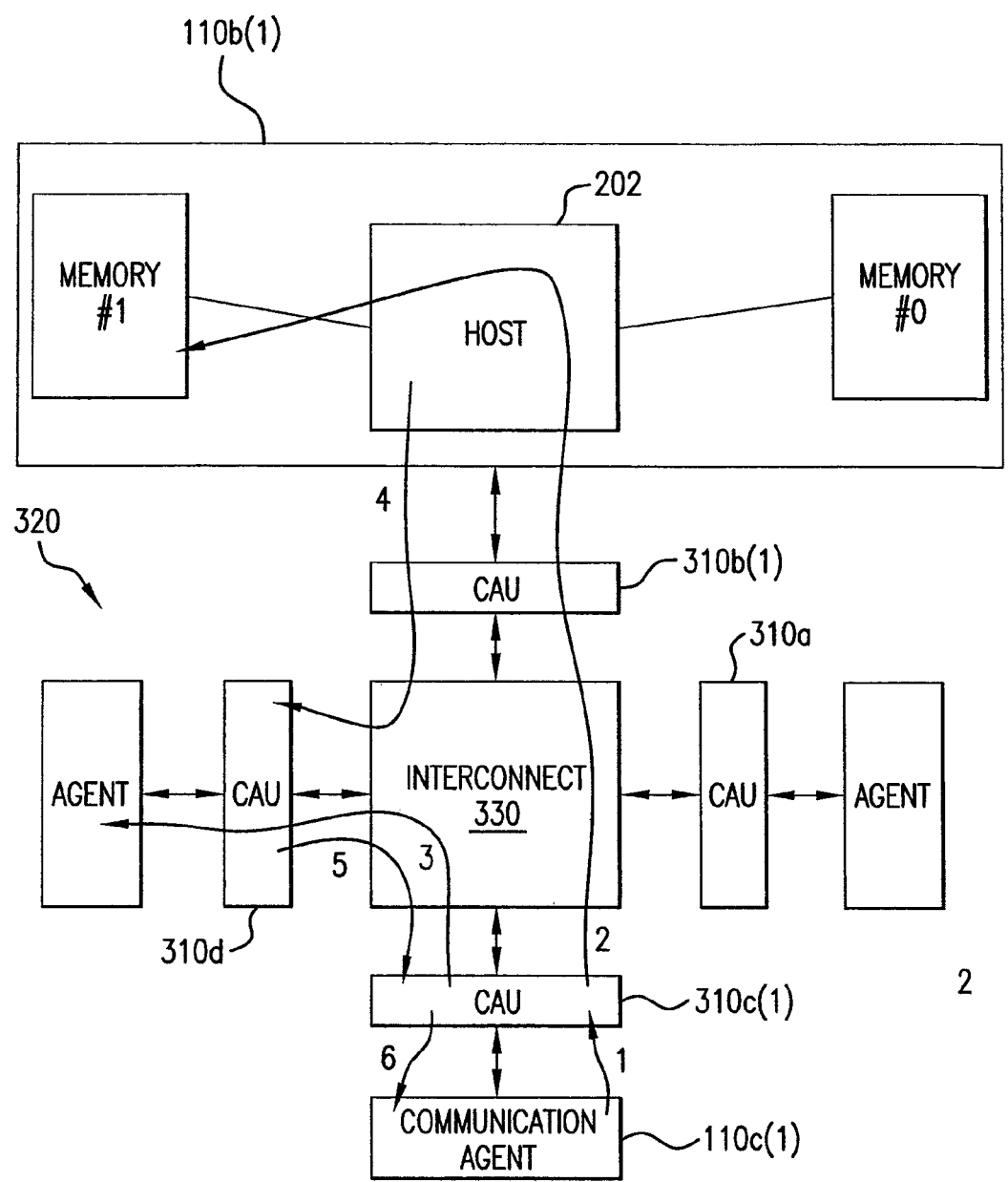
FIG. 17 illustrates an example data flow.
Figure 18:
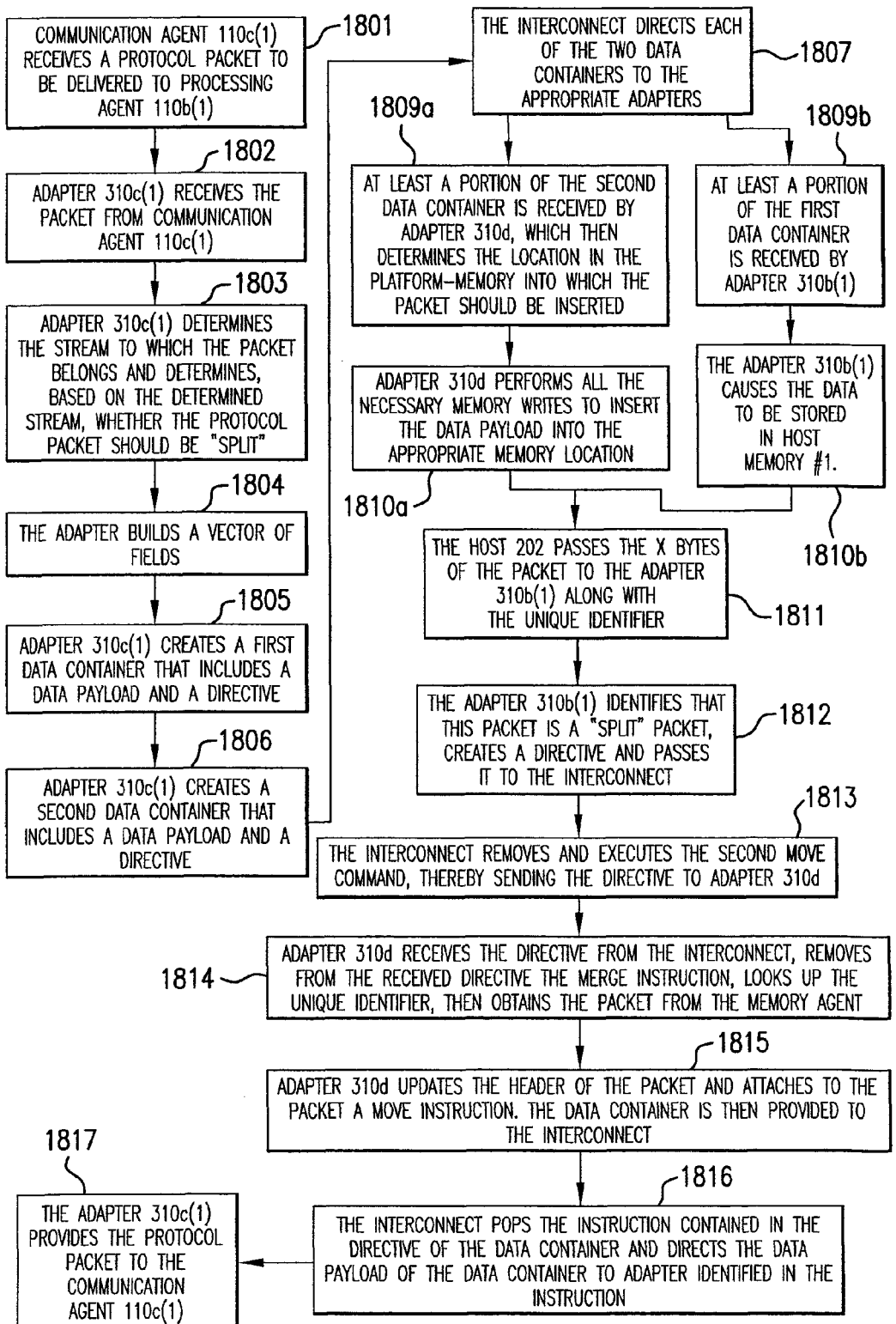
FIG. 18 is a flow chart illustrating a process according to an embodiment of the invention.

Referring now to FIGS. 17 and 18, FIG. 17 show another example flow of data through platform hub 320 and FIG. 18 is a flow chart describing the steps of the data flow.

Referring now to FIG. 18, the data flow may begin in step 1801, wherein communication agent 110c(1) receives a protocol packet to be delivered to processing agent 110b(1). In step 1802, adapter 310c(1) receives the packet from communication agent 110c(1).

In step 1803, adapter 310c(1) parses the protocol packet and determines the stream to which the packet belongs (e.g., it may identify that the packet as belonging to a certain stream (e.g., stream #N)) and determines, based on the determined stream, whether the protocol packet should be "split." A split operation means that, for example, certain data and/or only a portion of the packet (e.g., the first X number of bytes of the packet, where X is greater than or equal to 0) need be provided to processing agent 110b(1), while a copy of the entire packet should be copied to storage agent 110d (which may be referred to as "platform memory"). For this example, we shall assume the packet should be split.

In step 1804, the adapter builds a vector of fields. This field-vector may include: fields that were extracted from the packet header (e.g., source/destination addresses Ethernet/IP etc.), fields extracted from the packet application data, data resulting from a certain operation (e.g. tupliz-hash calculation on the packet data/header-fields) and/or data retrieved from storage (e.g., from stored configuration information).

In step 1805, adapter 310c(1) creates a first data container that includes a data payload and a directive. The data payload includes the first X bytes of the protocol packet (X>=0). The directive includes: (1) routing information that instructs interconnect 330 to provide the data container to adapter 310b, (2) the field-vector and (3) a unique identifier that represents the protocol packet and is used, in a later phase, to retrieve the protocol packet. This data container is then sent to the processing agent 110b(1).

In step 1806, adapter 310c(1) creates a second data container that includes a data payload and a directive. The data payload includes the entire application data portion of the protocol packet (it may also include the headers). The directive includes: (1) routing information that instructs interconnect to provide the data container to adapter 310d and (2) the unique identifier.

In step 1807, the interconnect directs each of the two data containers to the appropriate adapters based on the routing information.

In step 1809(a), at least a portion of the second data container is received by adapter 310d, which then determines the location (e.g., ring) in the platform-memory into which the packet should be inserted. In step 1810(a), adapter 310d performs all the necessary memory writes to insert the data payload into the appropriate memory location of storage 110d.

In step 1809(b), at least a portion of the first data container is received by adapter 310b(1).

In step 1810(b), the adapter 310b(1) causes the data (i.e., the first X bytes of the protocol packet, the field-vector and unique identifier) to be stored in host memory #1.

Using at least some of the data received from adapter 310b(1), an application running on the host determines that the protocol packet should be routed to the communication agent 110c(1) with a different destination address. The application does not necessarily know it holds only a part of the packet. Accordingly, the application sends the X bytes packet as if it was the entire packet. In step 1811, the host 202 passes the X bytes of the packet to the adapter 310b(1) along with the unique identifier.

Figure 19:
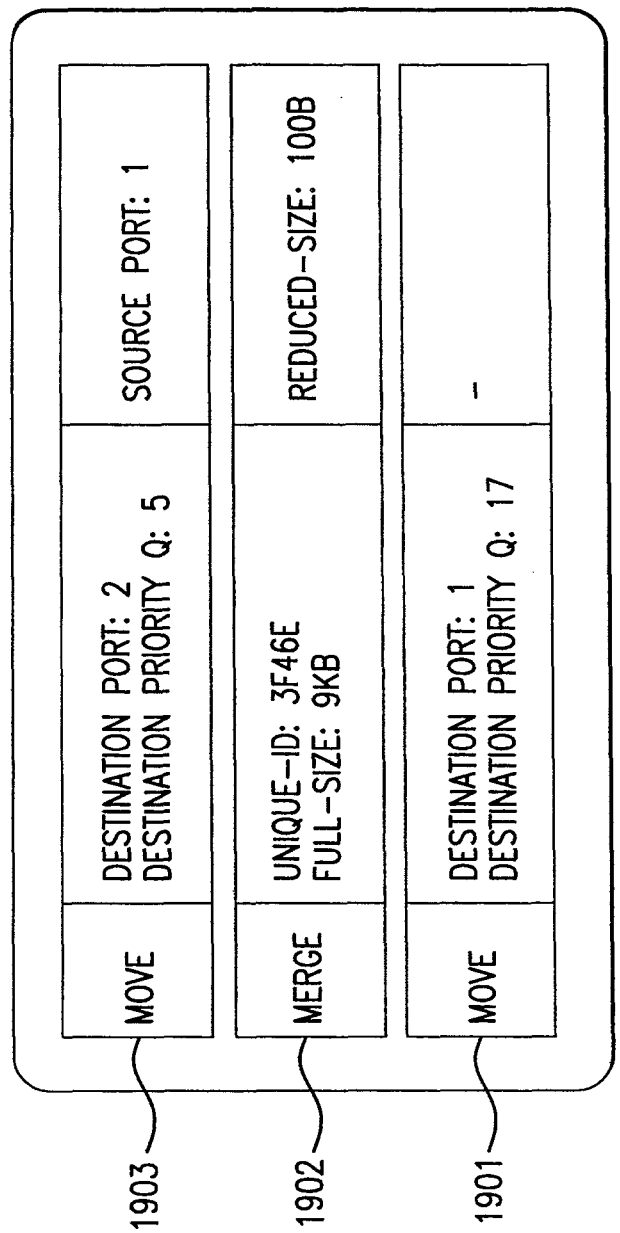
FIG. 19 illustrates an example directive.

In step 1812, the adapter 310b(1) identifies that this packet is a "split" packet based on information received from the host and creates a directive. The directive includes: (1) a first MOVE instruction 1901 (see FIG. 19) that identifiers adapter 310c(1) as the destination of the directive, (2) a merge instruction 1902 and (3) a second MOVE instruction 1903 that identifiers adapter 310d as the destination of the directive. The adapter then passes the directive to the interconnect.

In step 1813, the interconnect removes and executes the second (i.e., top) MOVE command 1903, thereby sending the directive to adapter 310d.

In step 1814, adapter 310d receives the directive from the interconnect, removes from the received directive the merge instruction 1902 and looks up the unique identifier (e.g., look the identifier up in a memory ring mapping table). The adapter 310d then obtains the packet from the memory agent 110d using the unique identifier.

In step 1815, adapter 310d updates the header of the packet according to the merge instruction and attaches to the packet move instruction 1901. The data container is then provided to the interconnect 330.

In step 1816, the interconnect 330 pops the MOVE instruction contained in the directive of the data container and directs the data payload of the data container (i.e., the protocol packet) to adapter identified in the MOVE instruction (which, in this case is adapter 310c(1)).

In step 1817, the adapter 310c(1) provides the protocol packet to the communication agent 110c(1), which may then transmit the packet over a communication channel.

As illustrated by the above example, the capabilities of PH 320 can improve performance of device 100 by preventing unnecessary data from getting to the host memory. As illustrated above, the host can perform a routing decision for a packet without needing the entire packet. For example, the host needs only a finite set of fields upon which it routes the packet. Since the uplink to the host (and from the host to it's memory) is a bottleneck in the system, saving data transfers on this bus can improve the entire platform performance.

Figure 20A:
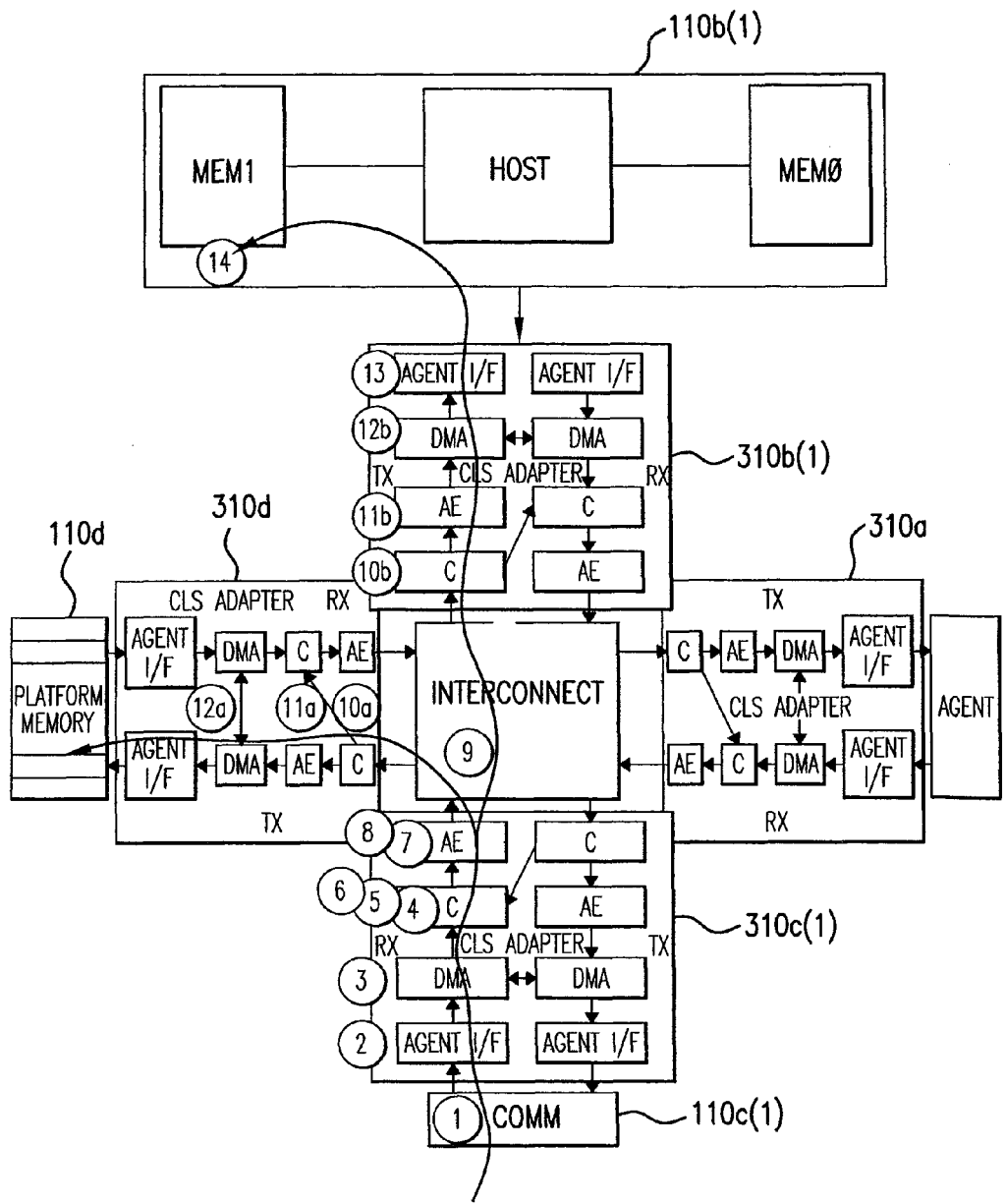
FIGS. 20A,B illustrate an example data flow.
Figure 20B:
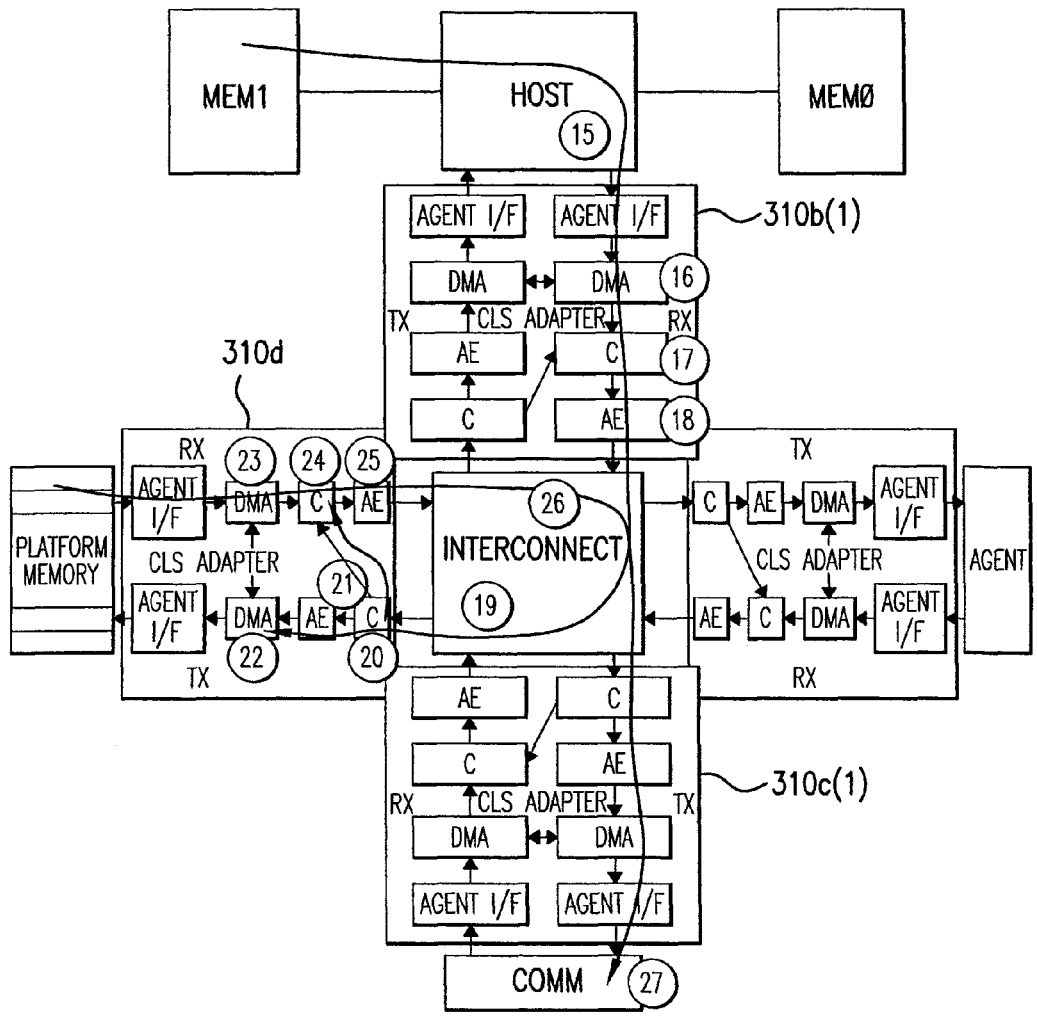
Figure 21A:
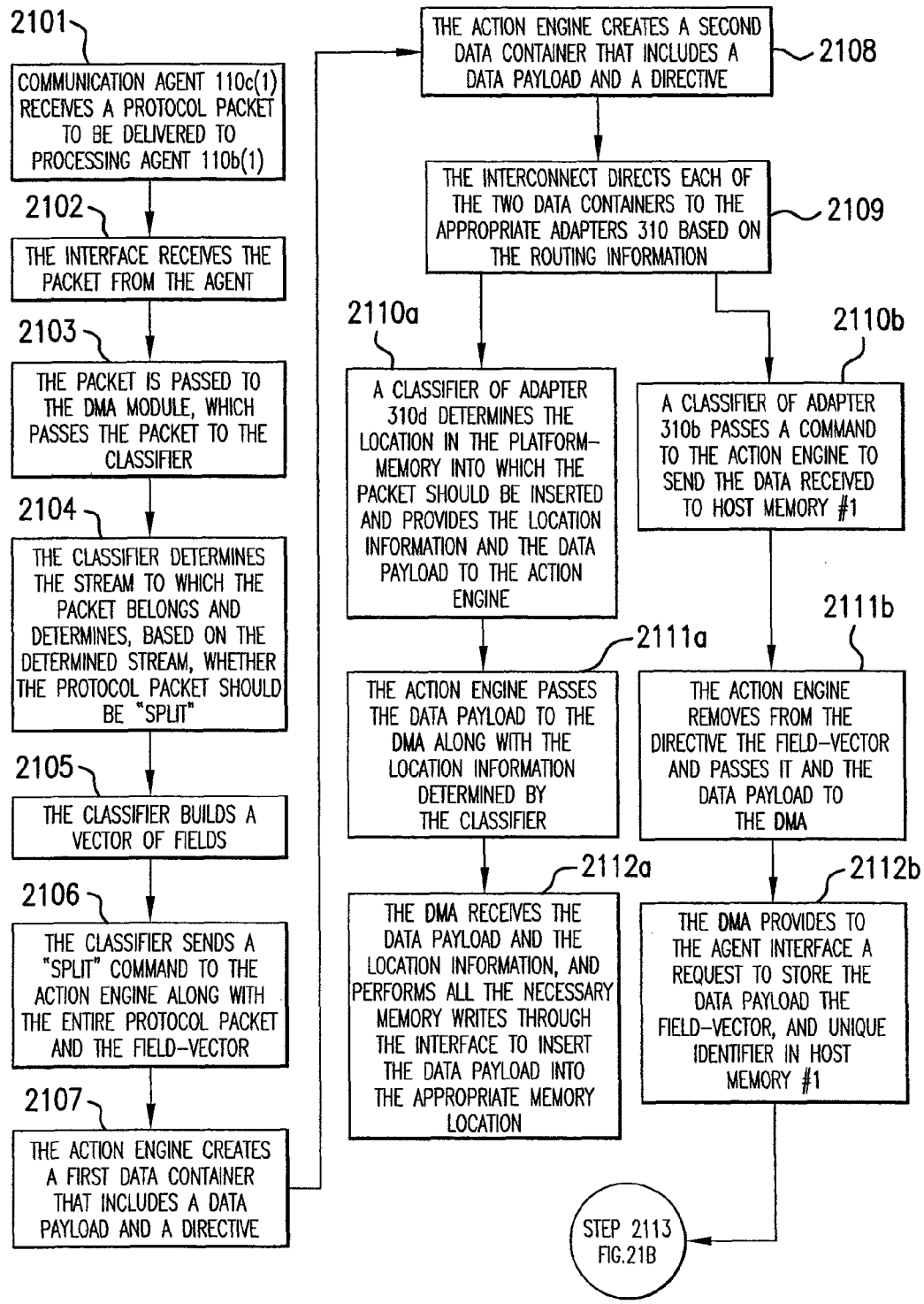
FIGS. 21A,B is a flow chart illustrating a process according to an embodiment of the invention.

Referring now to FIGS. 20A,B and 21A,B, FIGS. 20A,B show an example implementation of the data flow shown in FIG. 17 and FIGS. 21A,B is a flow chart describing the steps of the example implementation.

Referring now to FIG. 21A, the data flow may begin in step 2101, wherein communication agent 110c(1) receives a protocol packet to be delivered to processing agent 110b(1). In step 2102, the interface (e.g. Ethernet Mac) translates the information from $1^{st}$ and/or $2^{nd}$ layers. In step 2103, the packet is passed to the DMA module, which in a simple case scenario doesn't need to perform any batch operation and simply passes the packet to the classifier.

In step 2104, classifier parses the protocol packet and determines the stream to which the packet belongs (e.g., it may identify that the packet as belonging to a certain stream (e.g., stream #N)) and determines, based on the determined stream, whether the protocol packet should be "split." A split operation means that, for example, certain data and/or only a portion (e.g., the first X number of bytes of the packet, where X is greater than or equal to 0, along with fields that were gathered by the classifier/parser and inserted as directives of extra-info to the processor) need be provided to processing agent 110b(1), while a copy of the entire packet or the portion of the packet that was not sent to the processing agent should be copied to storage agent 110d (which may be referred to as "platform memory"). For this example, we shall assume the packet should be split.

In step 2105, the classifier builds a vector of fields. This field-vector may include fields that were extracted from the packet header (e.g., source/dest addresses eth/ip etc.), fields extracted from the packet data, and/or data resulting from a certain operation (e.g. tupliz-hash calculation on the packet data/header-fields) or retrieved from storage (e.g., from stored configuration information).

In step 2106, the classifier sends a "split" command to the action engine along with the entire protocol packet and the field-vector.

In step 2107, the action engine creates a first data container that includes a data payload and a directive. The data payload includes the first X bytes of the protocol packet. The directive includes: (1) routing information that instructs interconnect 330 to provide the data container to adapter 310b(1), (2) the field-vector and (3) a unique identifier that represents the protocol packet and is used, in a later phase, to retrieve the protocol packet.

In step 2108, the action engine creates a second data container that includes a data payload and a directive. The data payload includes the entire application data portion of the protocol packet (it may also include the headers). The directive includes: (1) routing information that instructs interconnect to provide the data container to adapter 310d and (2) the unique identifier.

In step 2109, the interconnect directs each of the two data containers to the appropriate adapters 310 based on the routing information.

In step 2110(a), at least a portion of the second data container is received by the TX classifier of adapter 310d, which then determines the location (e.g., ring) in the platform-memory into which the packet should be inserted and provides the location information and the data payload to the action engine.

In step 2111(*a*), the action engine passes the data payload to the DMA along with the location information determined by the classifier.

In step 2112(*a*), the DMA receives the data payload and the location information, and performs all the necessary memory writes through the interface (which may resemble a Memory Controller) to insert the data payload into the appropriate memory location.

In step 2110(*b*), at least a portion of the first data container is received by the TX classifier of adapter 310*b* and the classifier passes a command to the action engine to send the data received by the classifier to Host memory #1.

In step 2111(*b*), the action engine removes from the directive the field-vector and passes it (e.g., out-of-band) and the data payload to the DMA.

In step 2112(*b*), the DMA provides to the agent interface a request to store the data payload the field-vector, and unique identifier in host memory #1. The field-vector is sent to a predefined descriptor area in Host memory #1.

Figure 21B:
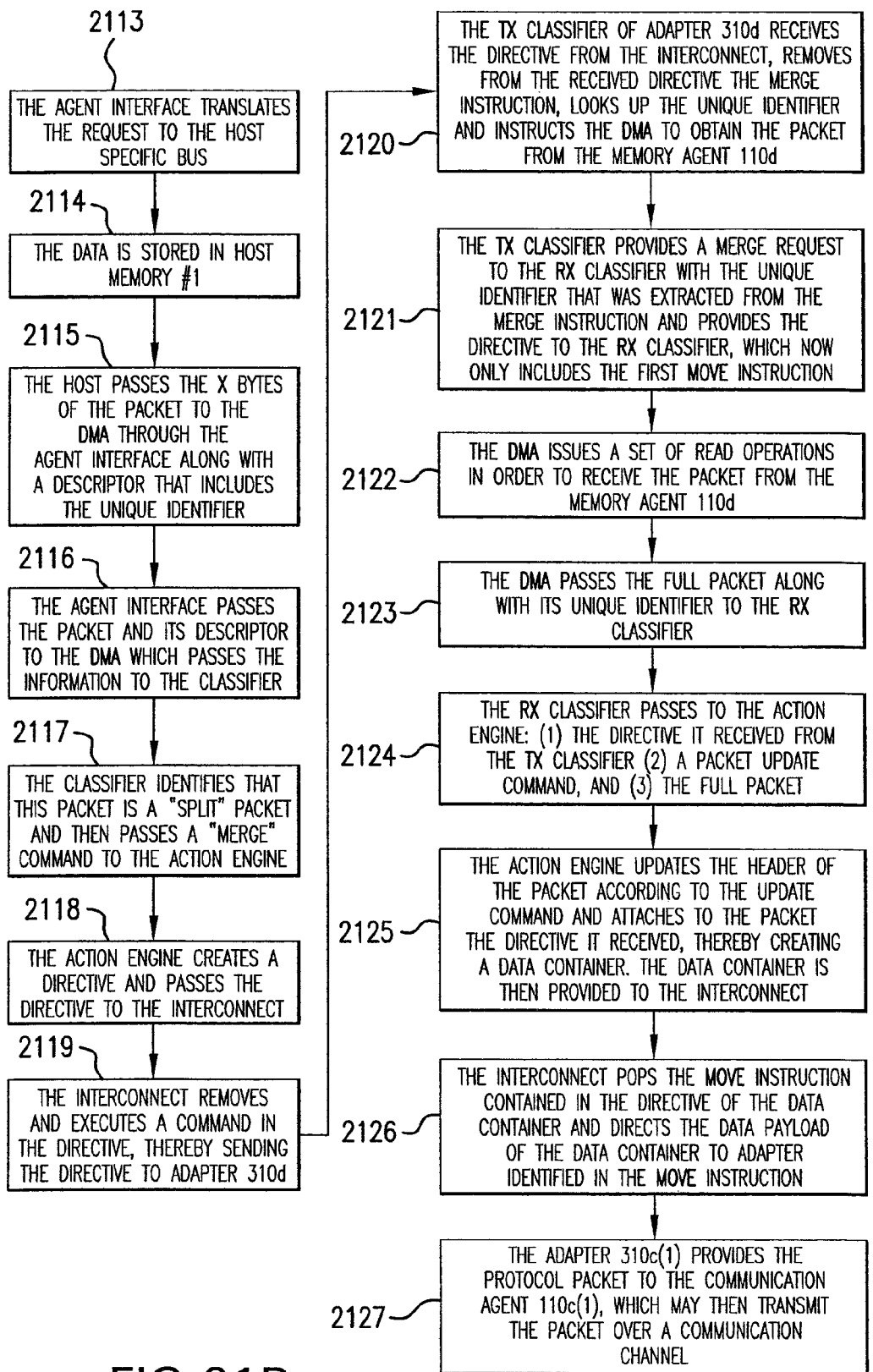

In step 2113 (see FIG. 21B), the agent interface translates the request to the host specific bus. In step 2114, the data (i.e., the first X bytes of the protocol packet, the field-vector and unique identifier) is stored in host memory #1.

Using the field-vector it received and the first X bytes from the protocol packet, an application running on the host determines that the protocol packet should be routed to the communication agent 110*c*(1) with a different destination address. The application does not necessarily know it holds only a part of the packet. Accordingly, it sends the X bytes packet as if it was the entire packet.

In step 2115, the host passes the X bytes of the packet to the DMA through the agent interface along with a descriptor that includes the unique identifier.

In step 2116, the agent interface passes the packet and it's descriptor to the DMA which passes the information to the classifier.

In step 2117, the classifier identifies that this packet is a "split" packet based on information received from the host and then passes a "merge" command to the action engine. The merge command includes: an identifier identifying adapter 310*d*, an identifier identifying adapter 310*c*(1), and the unique identifier.

In step 2118, the action engine creates a directive. The directive includes: (1) a first MOVE instruction that identifiers adapter 310*c*(1) as the destination of the directive, (2) a merge instruction and (3) a second MOVE instruction that identifiers adapter 310*d* as the destination of the directive. The action engine then passes the directive to the interconnect.

In step 2119, the interconnect removes and executes the second (i.e., top) MOVE command, thereby sending the directive to adaptor 310*d*.

In step 2120, the TX classifier of adapter 310*d* receives the directive from the interconnect, removes from the received directive the merge instruction and looks up the unique identifier (e.g., look the identifier up in a memory ring mapping table). The classifier then instructs the DMA to obtain the packet from the memory agent 110*d*.

In step 2121, the TX classifier also provides a merge request to the RX classifier with the unique identifier that was extracted from the merge instruction and provides the directive to the RX classifier, which now only includes the first MOVE instruction. The RX classifier awaits the full packet to return from the DMA.

In step 2122, the DMA issues a set of read operations in order to receive the packet from the memory agent 110*d*.

In step 2123, the DMA passes the full packet along with its unique identifier to the RX classifier.

In step 2124, the RX classifier passes to the action engine: (1) the directive it received from the TX classifier (2) a packet update command, and (3) the full packet. The packet update command includes the fields (e.g., IP and/or Ethernet destination address) that should be replaced and their new values.

In step 2125, the action engine updates the header of the full packet according to the update command it received from the classifier and attaches to the packet the directive it received, thereby creating a data container. The data container is then provided to the interconnect.

In step 2126, the interconnect pops the MOVE instruction contained in the directive of the data container and directs the data payload of the data container (i.e., the protocol packet) to adapter identified in the MOVE instruction (which, in this case is adapter 310*c*(1)).

In step 2127, the adapter 310*c*(1) provides the protocol packet to the communication agent 110*c*(1), which may then transmit the packet over a communication channel.

Figure 23:
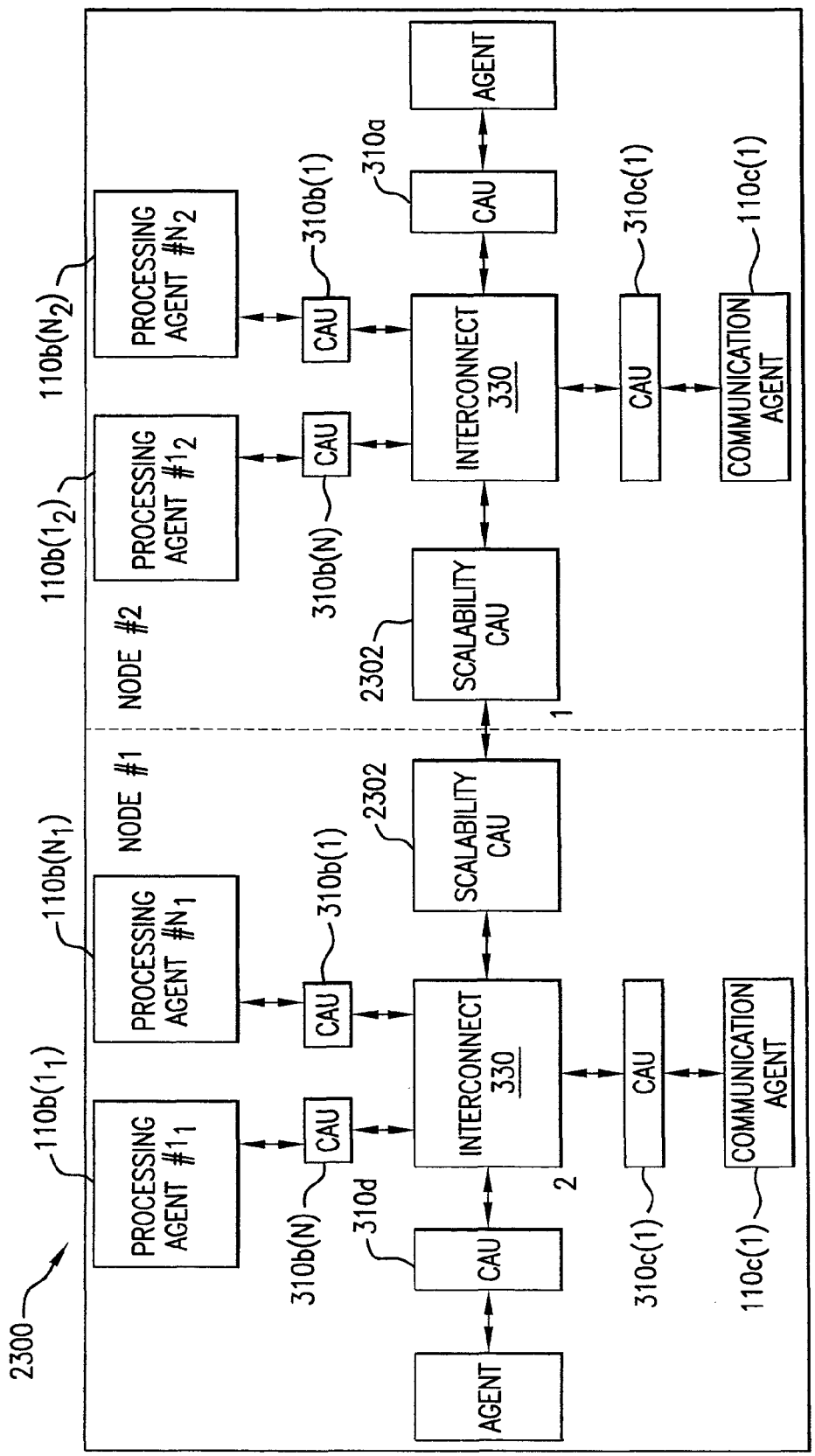
FIGS. 23-26 illustrate various other embodiments of the invention.

Referring now to FIG. 23, FIG. 23 illustrates a system 2300 according to some embodiments of the invention. As illustrated in FIG. 23, the above described features of the present invention can be used to enable the creation of a scalable multi-node interconnect network 2300. In system 2300, a platform hub 320 and its associated agents are considered to be a "node." In the example shown in FIG. 23, system 2300 includes two nodes (i.e., node #1 and node #2) that interconnect with each other using scalability adapter units 2302.

While FIG. 23 illustrates the scalability adapter unit of node #1 being connected to the scalability adapter unit of node #2, this was done merely for illustration. It is contemplated that an interconnect may be positioned between the scalability adapter units, thereby enabling a scalability adapter unit to communicate with several other scalability adapter units.

There can be several ways to implement a multi-node network, such as network 2300. An example of a simple implementation would be to add a node identifier to a MOVE instruction. In addition, in this kind of implementation, DMA translation tables may have to be enlarged to include its visible ports in each node. Each interconnect 330 may hold a structure that indicates the correct scalability CAU 2302 to which to send each packet in order to get to the required node. Each interconnect routing structure is configured to forward each packet to the correct node. A packet that reaches its destination node is routed by the interconnect of the destination node to the correct port on that node. In some embodiments, an interconnect 330 pops the head MOVE command only if the node identifier included in the MOVE command identifies the node of the interconnect.

The scalability CAUs 2302 enable the connection between the different interconnects, thereby connecting different nodes. The scalability CAU can be configured to forward multicast messages to the next node or restrict them to the nodes boundary.

Figure 24:
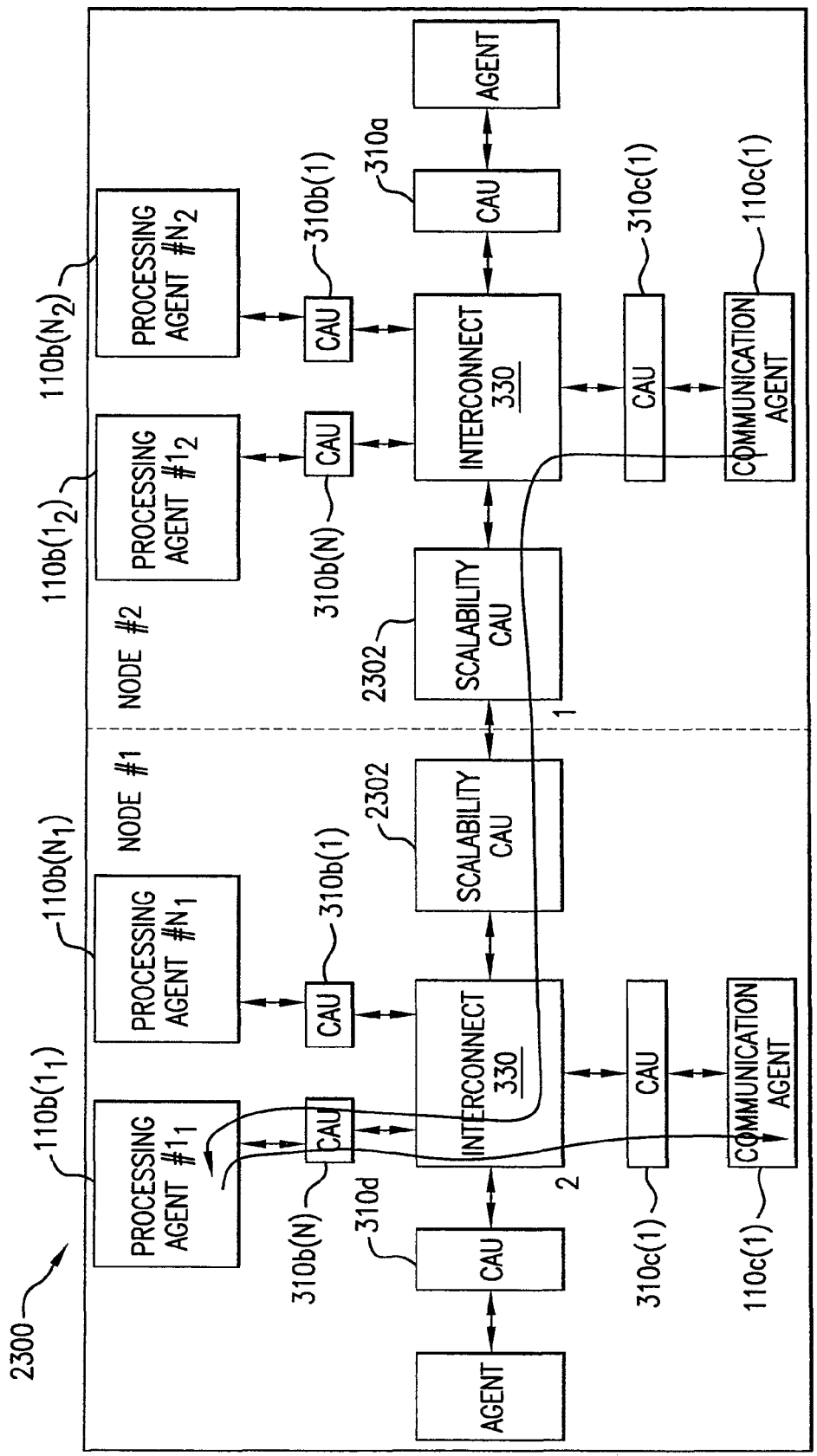

Each communication CAU (i.e., a CAU that serves a communication agent) can be further configured to enable a fail-proof structure. In case of a fail or high-load situation on the nodes processing agents, a communication CAU may forward new incoming streams to a different node. This feature is illustrated in FIG. 24. As illustrated in FIG. 24, CAU 310*c*(1) of node #2 may receive a data from agent 110*c*(2) of node #2 and, instead of sending the data to a processing agent of node #2, may send the data to a processing agent on node

1 by, for example, creating a data container that contains the data and a directive that includes a MOVE command that includes an identifier identifying node #1, which move command causes the interconnect 330 of node #2 to send the data container to the scalability unit 2302 of node #2. Upon receiving the data container, the scalability unit 2302 of node #2 sends the data container to an adapter unit of node #1. This adapter unit of node #1 may send the data to a processing agent on node #1, which processing agent may process the data and then send the processed data to a communication agent on node #1. In this manner, a communication stream from one node is directed to a processing agent in another node and then forwarded to a different communication agent.

Figure 25:
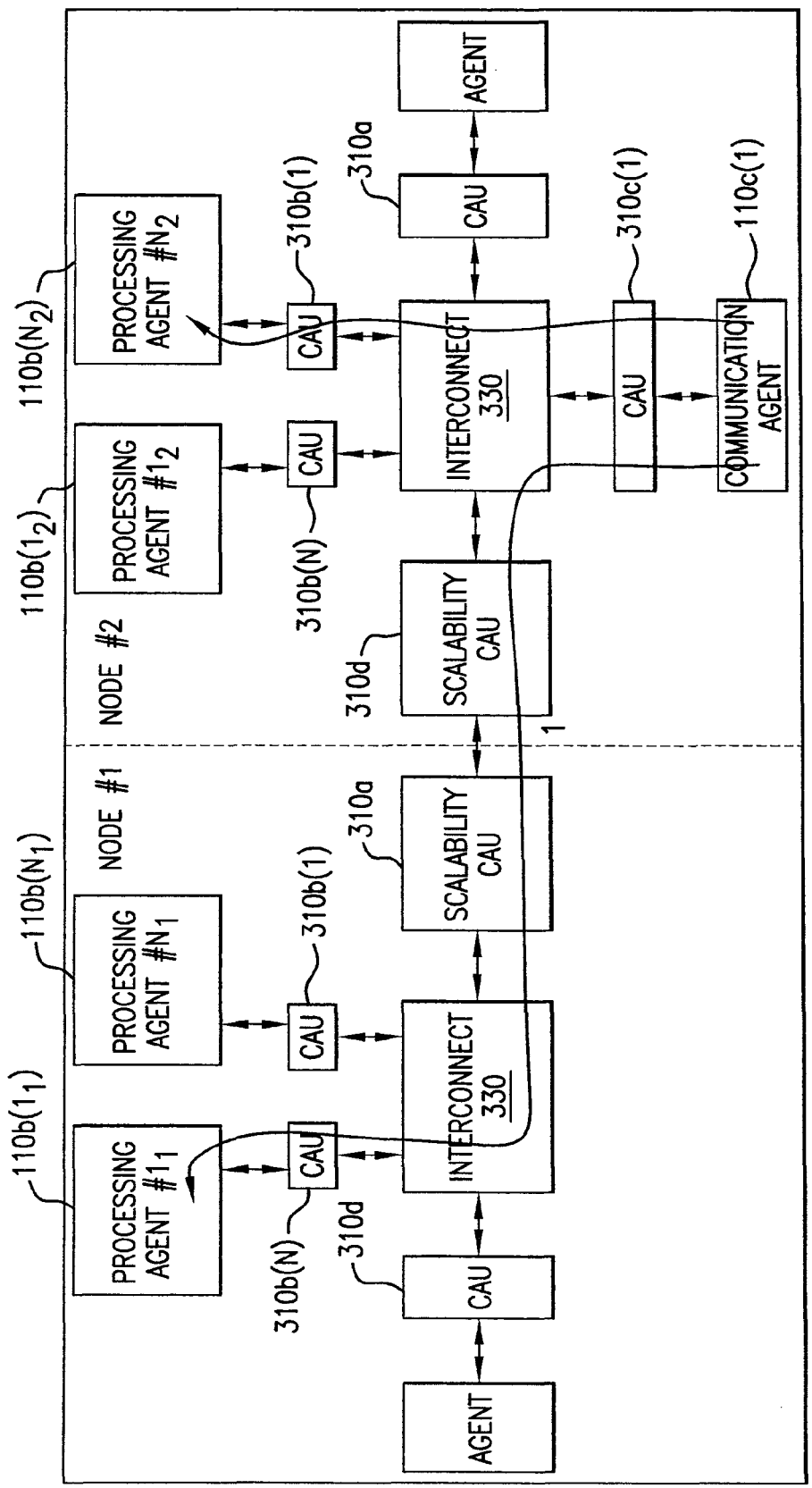

Using several platform hubs in a scalable connection enables multiple connections to several processors and gives the ability to spread traffic from a single communication agent to a scalable number of processing agents. This feature is illustrated in FIG. 25. As illustrated in FIG. 25, CAU 310c(1) may be configured so that some data received from agent 110c(1) is provided to a processing agent of node #2, whereas some other data received from agent 110c(1) is provided to a processing agent of node #1. For example, CAU 310c(1) may be configured so that protocol packets received from agent 110c(1) having a certain characteristic (e.g., source address or other characteristic) are provided to a processing agent on node #1, whereas other protocol packets are provided to a processing agent of node #2. In this manner, traffic can be spread to a scalable number of processing agents.

Figure 26:
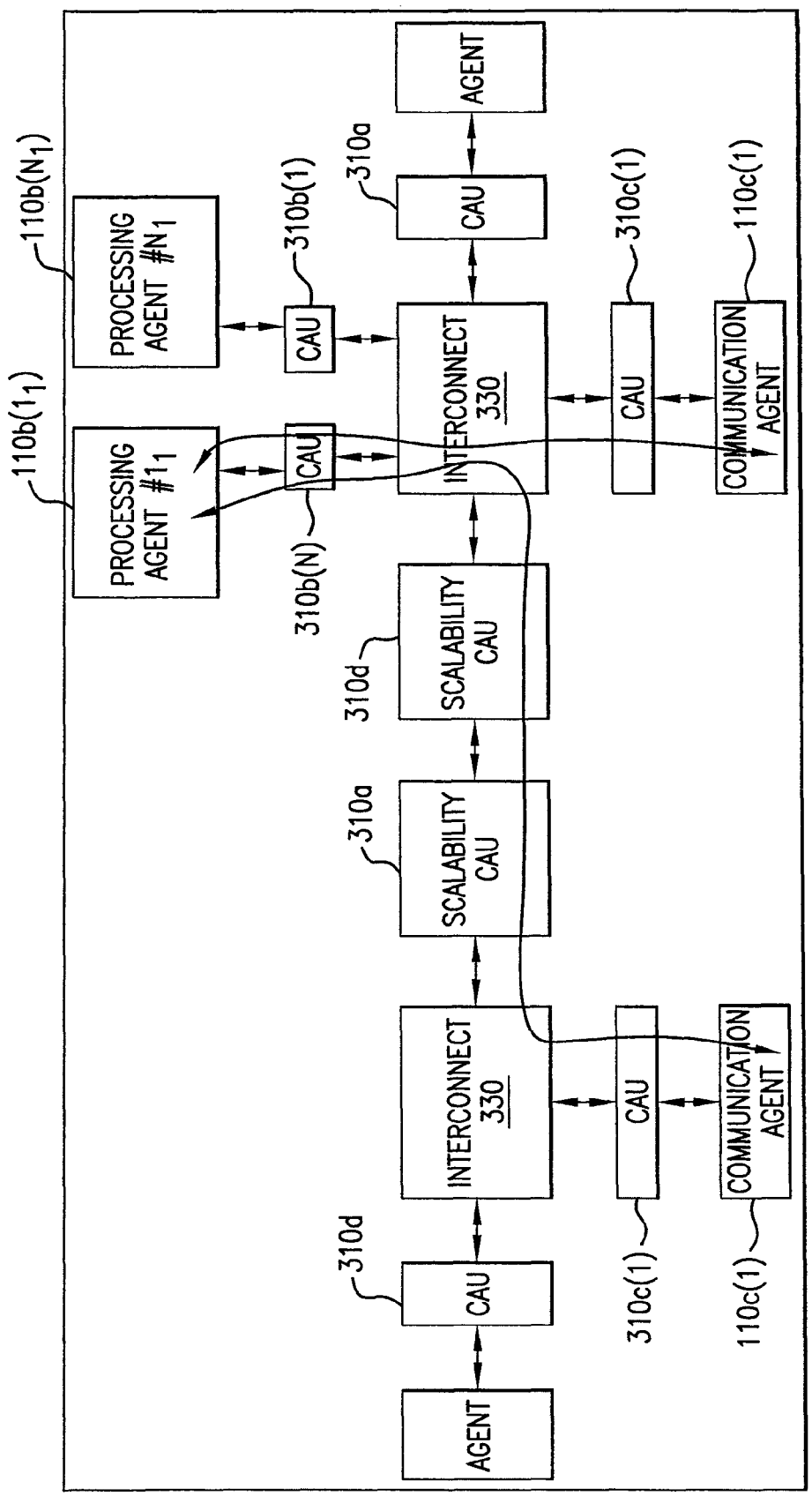

Additionally, using several platform hubs in a scalable connection enables multiple connections to a communication agent. This means the communication channel bandwidth is scalable as well. This feature is illustrated in FIG. 26.

While various embodiments/variations of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A processing device, comprising:
a housing;
a chip housed in the housing;
a first processing agent housed in the housing and connected to the chip; and
a network interface operable to connect the processing device to an external network that is external to the housing, wherein
the chip comprises:
an interconnect;
a second processing agent communicatively connected to the interconnect, the second processing agent comprising a plurality of general purpose processor cores and a cache memory;
a network adapter communicatively connected to the interconnect and to the network interface, the network adapter being operable to receive and classify protocol packets received from the network interface; and
an accelerating agent communicatively connected to the interconnect, the accelerating agent being adapted to perform acceleration operations, wherein
the network adapter is configured red such that in response to receiving a packet comprising a header and a payload, the network adapter uses the interconnect to store the payload in the cache memory of the second processing agent.

2. The processing device of claim 1, wherein the network adapter is configured such that, in response to receiving via the network interface a packet having a header and a data payload, the network adapter i) compares data from both the data payload and header with pre-determined data, and ii) performs a certain predetermined action in response to determining that the compared data matches the predetermined data.

3. The processing device of claim 2, wherein the network adapter comprises a packet parser and an action engine communicatively connected to the packet parser, wherein the action engine is operable to receive from the packet parser packet data and/or commands, and the action engine is further operable to do one or more of (i) perform a packet filtering operation on packets parsed by the packet parser and (ii) perform a packet modification operation on packets parsed by the packet parser.

4. The processing device of claim 1, wherein
the accelerating agent is a cryptographic accelerating agent, and
the second processing agent is adapted to use the interconnect to provide to the cryptographic accelerating agent i) the payload and ii) a command identifying a cryptographic operation that the cryptographic accelerating agent should perform on the payload.

5. The processing device of claim 4, wherein the cryptographic accelerating agent comprises a direct memory access (DMA) engine coupled to the interconnect, and the DMA engine is configured to i) receive the payload provided by the second processing agent and ii) write the payload into a memory space of the cryptographic agent.

6. A chip for use in a network server comprising a first processing agent and a network interface, said chip comprising:
an interconnect;
a second processing agent communicatively connected to the interconnect, the second processing agent comprising a plurality of general purpose processor cores and a cache memory;
a network adapter communicatively connected to the interconnect and to the network interface, the network adapter being operable to receive and classify protocol packets received from the network interface; and
an accelerating agent communicatively connected to the interconnect, the accelerating agent being adapted to perform acceleration operations, wherein
the network adapter is configured such that, in response to receiving a packet comprising a header and a payload, the network adapter uses the interconnect to store the payload in the cache memory of the second processing agent.

7. The chip of claim 6, wherein the network adapter is configured such that, in response to receiving via the network interface a packet having a header and a data payload, the network adapter i) compares data from both the data payload and header with pre-determined data, and ii) performs a certain predetermined action in response to determining that the compared data matches the predetermined data.

8. The chip of claim 7, wherein the network adapter comprises a packet parser and an action engine communicatively connected to the packet parser, wherein the action engine is operable to receive from the packet parser packet data and/or commands, and the action engine is further operable to do one or more of (i) perform a packet filtering operation on packets parsed by the packet parser and (ii) perform a packet modification operation on packets parsed by the packet parser.

9. The chip of claim 6, wherein the network adapter comprises a packet parser, an action engine, and an identifier module operable to receive packet information from the packet parser and, based on the packet information and configuration data, provide a command to the action engine.

10. The chip of claim 6, wherein the network adapter is operable to determine a flow to which a packet received from the network interface.

11. The chip of claim 10, wherein the network adapter is operable to determine whether a received packet meets specified criteria and is operable to drop the received packet in response to determining that the packet meets the specified criteria.

12. The chip of claim 10, wherein acceleration agent is a cryptographic acceleration agent.

13. The chip of claim 6, wherein the network adapter is further operable, such that, in response to receiving a packet from the network interface, the network adapter is operable to determine whether the received packet comprise a Transmission Control Protocol (TCP) protocol data unit (PDU).

14. A chip for use in a processing device, said chip comprising:
   an interconnect;
   a packet processor communicatively connected to the interconnect and communicatively connected to a network interface, the packet processor being operable to receive packet via the network interface; and
   a processing agent communicatively connected to the interconnect, the processing agent comprising a plurality of processor cores and cache memory, wherein the packet processor is configured to:
   parse a received packet and perform one or more actions based on information contained in the received packet, wherein said actions include providing at least a portion of the received packet to the cache memory of the processing agent via the interconnect.

15. The chip of claim 14, wherein the cache memory comprises a plurality of L2 caches.

16. The chip of claim 14, wherein the packet processor comprises:
   a packet parser configured to parse packets provided to the packet processor from the communication agent and to extract one or more fields from the packets; and a configurable action engine operable to (a) receive one or more packet fields extracted by the packet parser and (b) perform one or more actions based on information contained in the received one or more packet fields, wherein said actions include providing a received packet to the processing agent via the interconnect.

17. The chip of claim 16, wherein the action engine is operable to perform packet filtering of the packets received from the communication agent.

18. The chip of claim 14, further comprising: an accelerating agent configured to perform a cryptographic function, the accelerating agent being communicatively connected to the processing agent through the interconnect.

19. The chip of claim 14, wherein the packet processor is operable to determine whether a packet received from the communication agent meets specified criteria and is operable to drop the packet in response to determining that the packet meets the specified criteria.

* * * * *